United States Patent Office 3,396,575
Patented Aug. 13, 1968

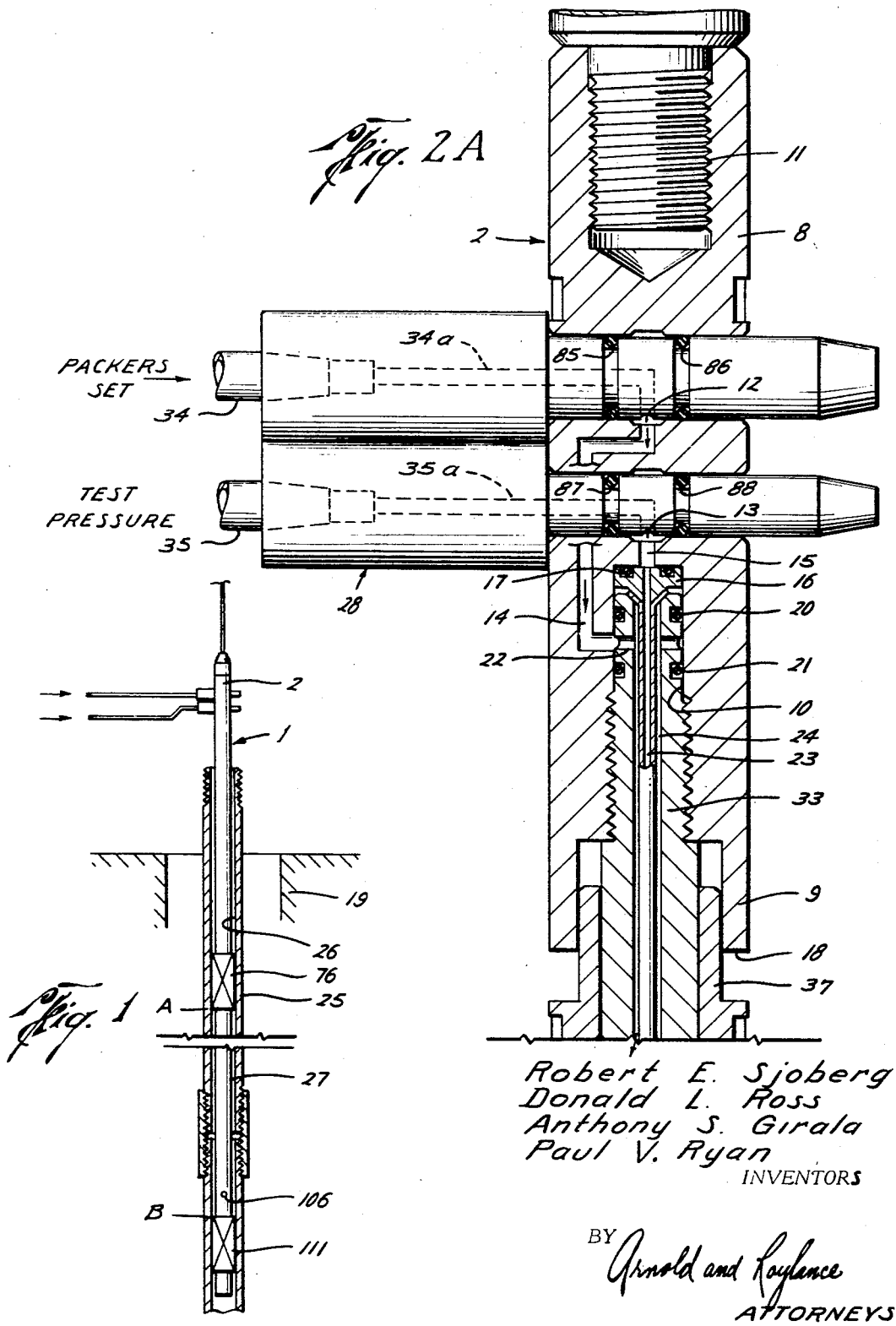

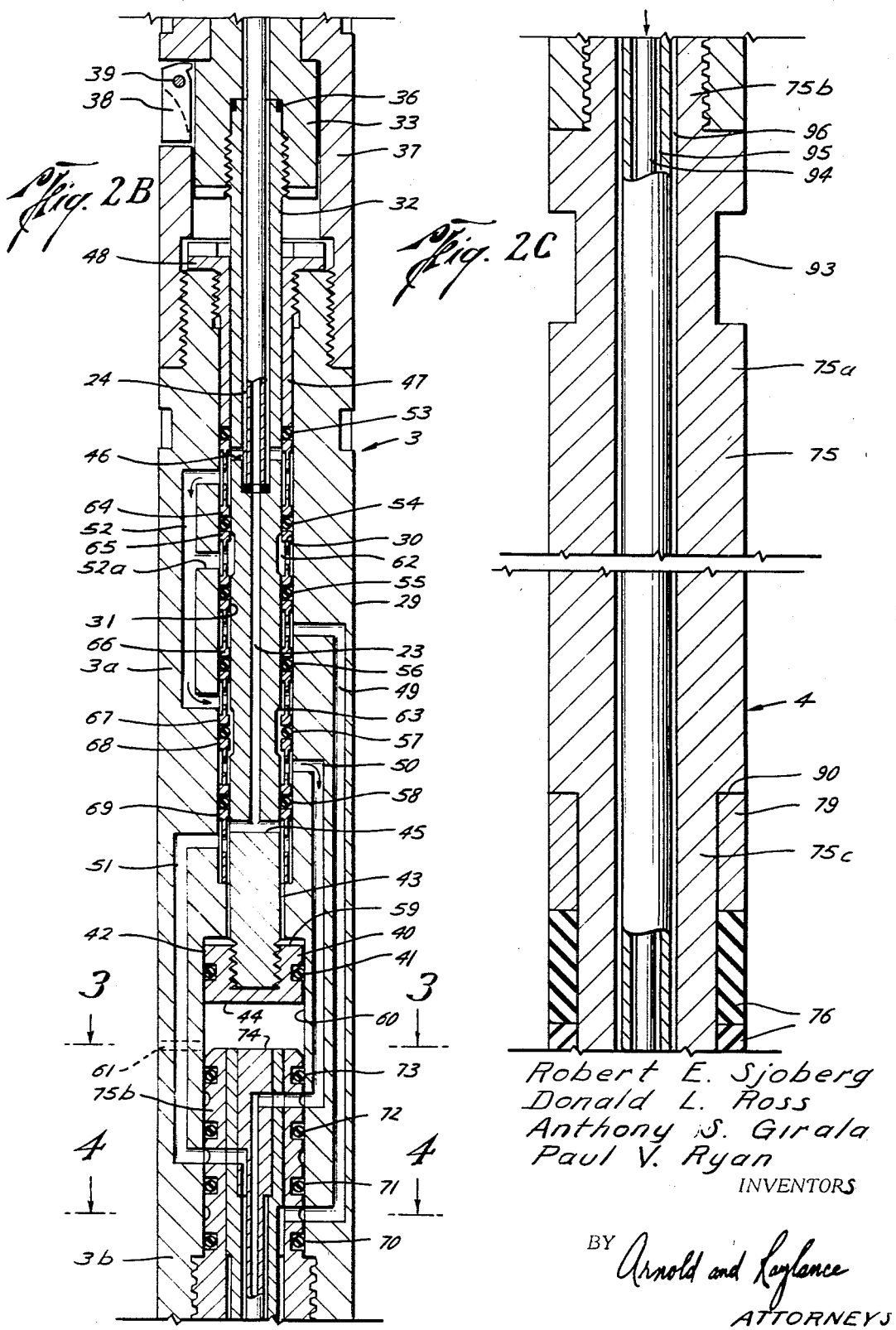

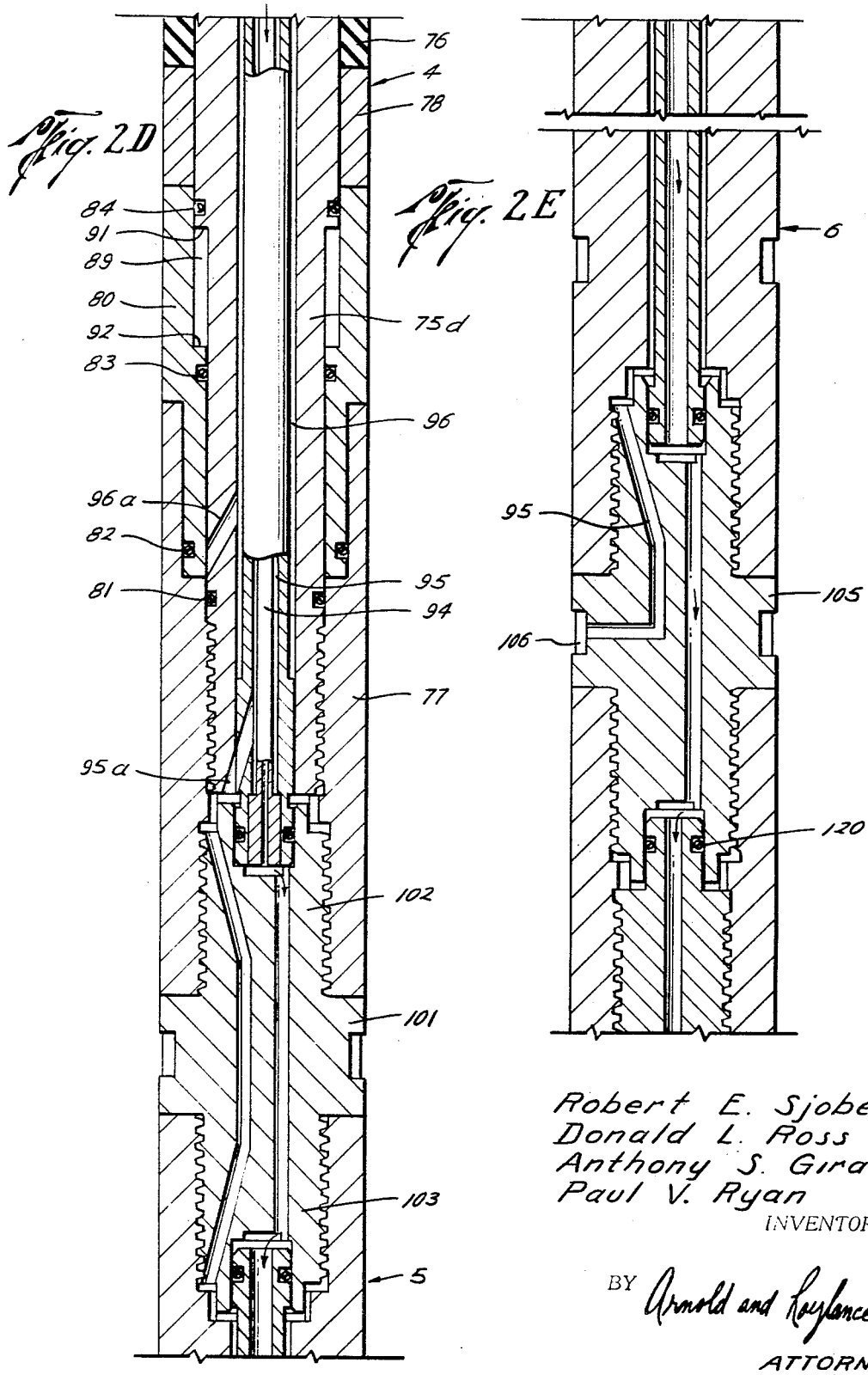

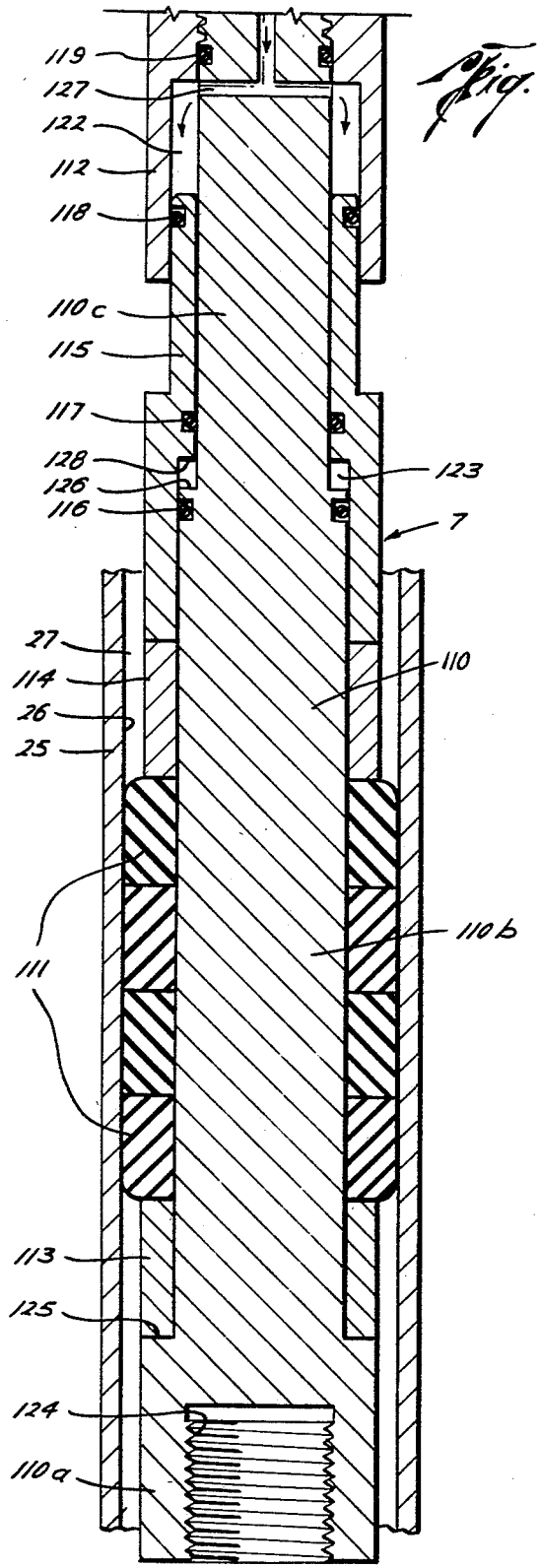
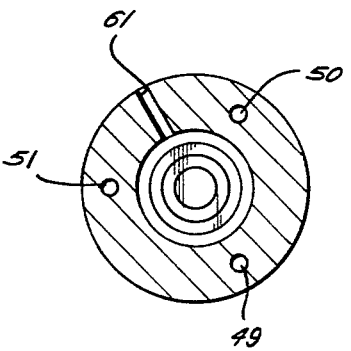
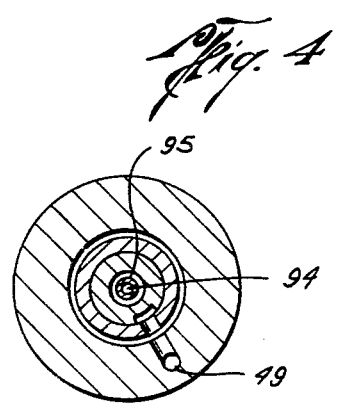

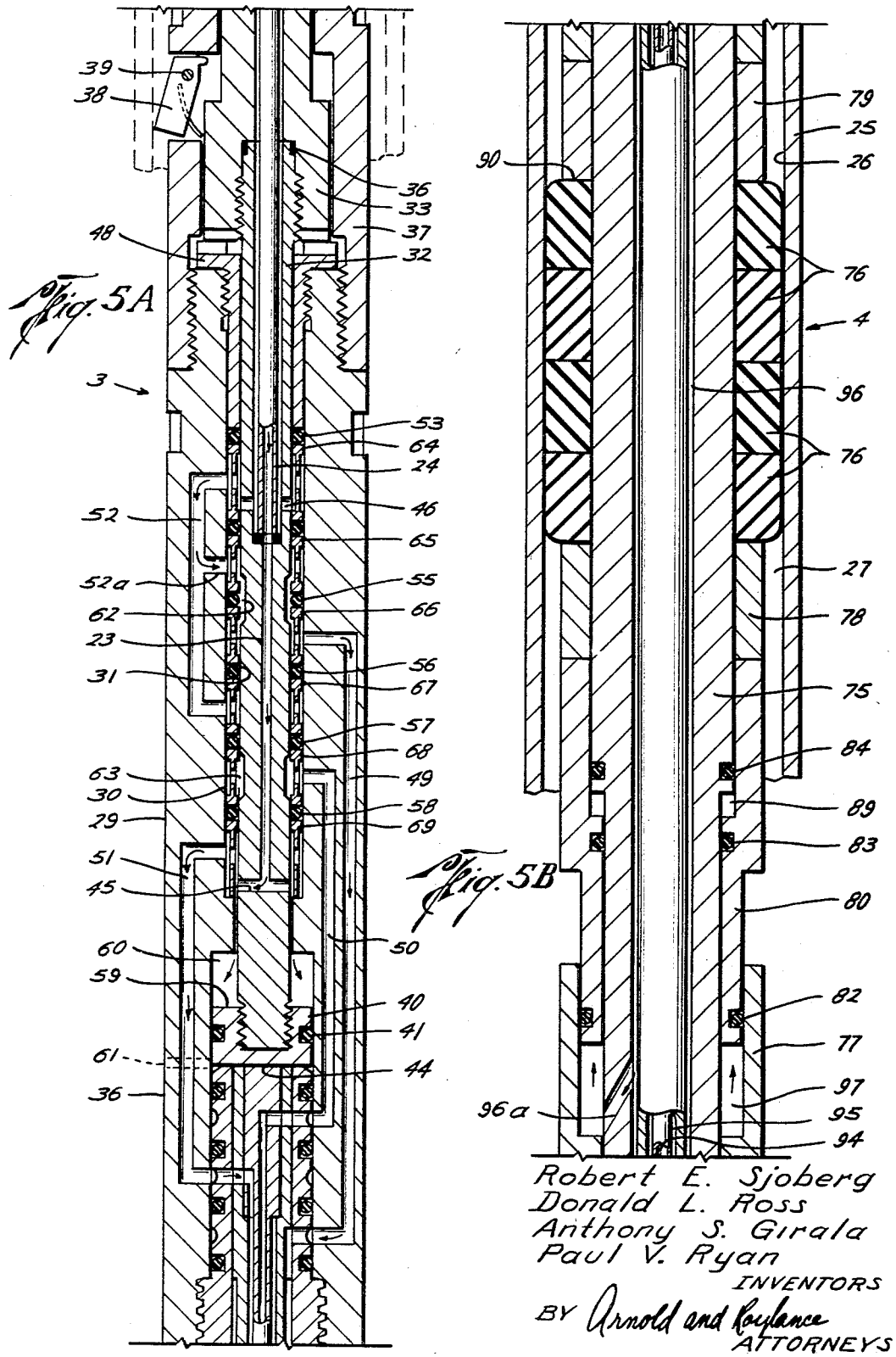

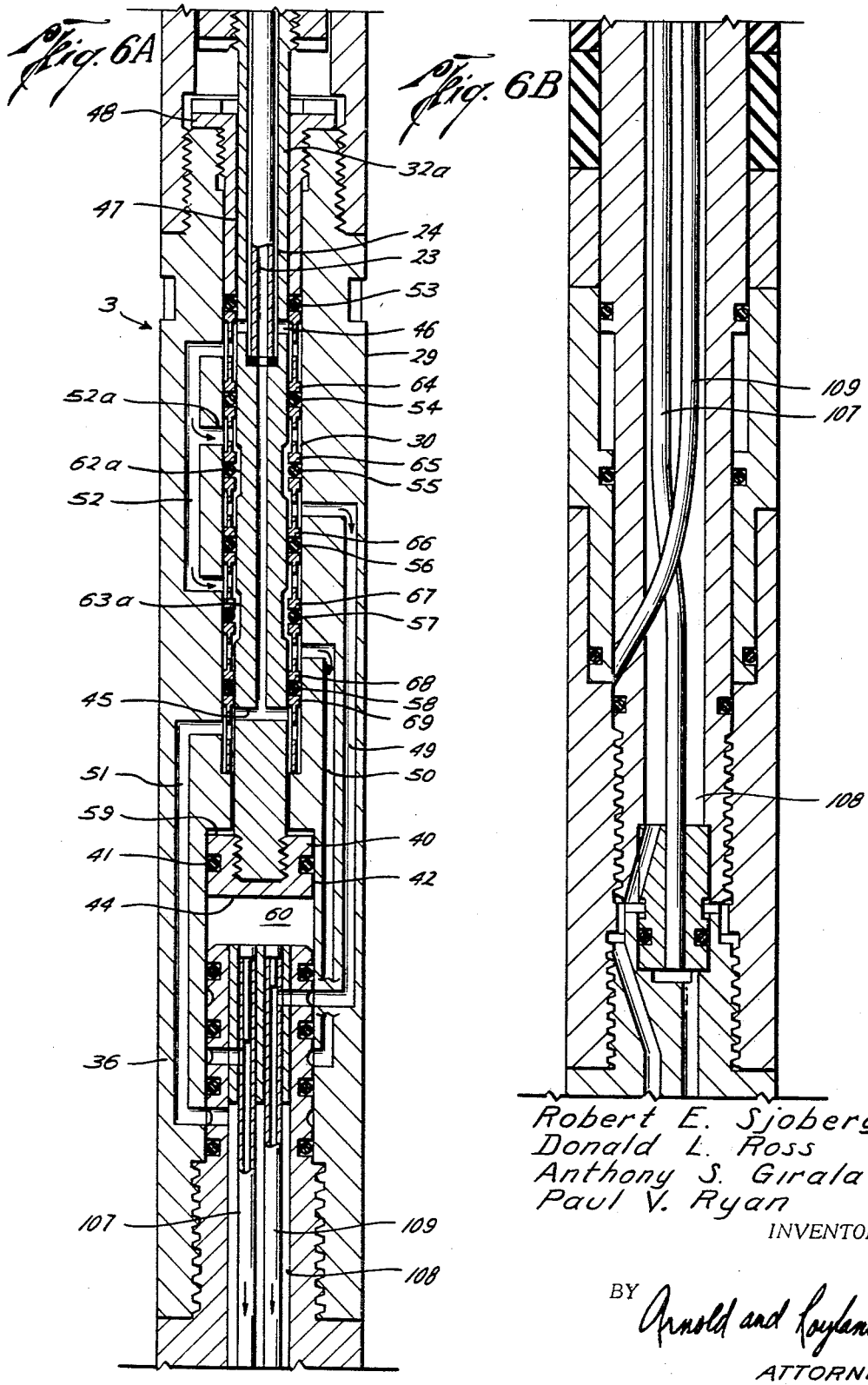

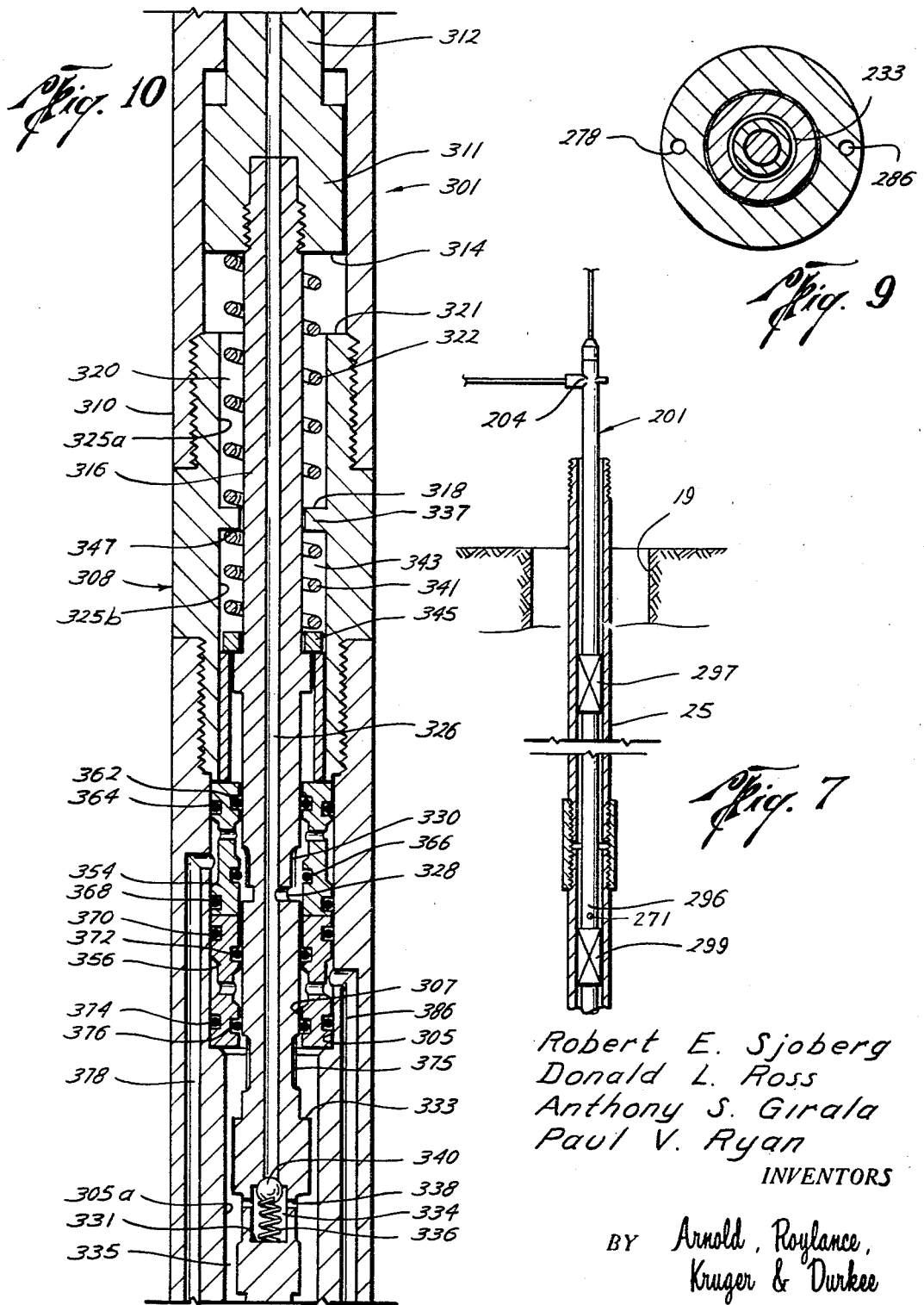

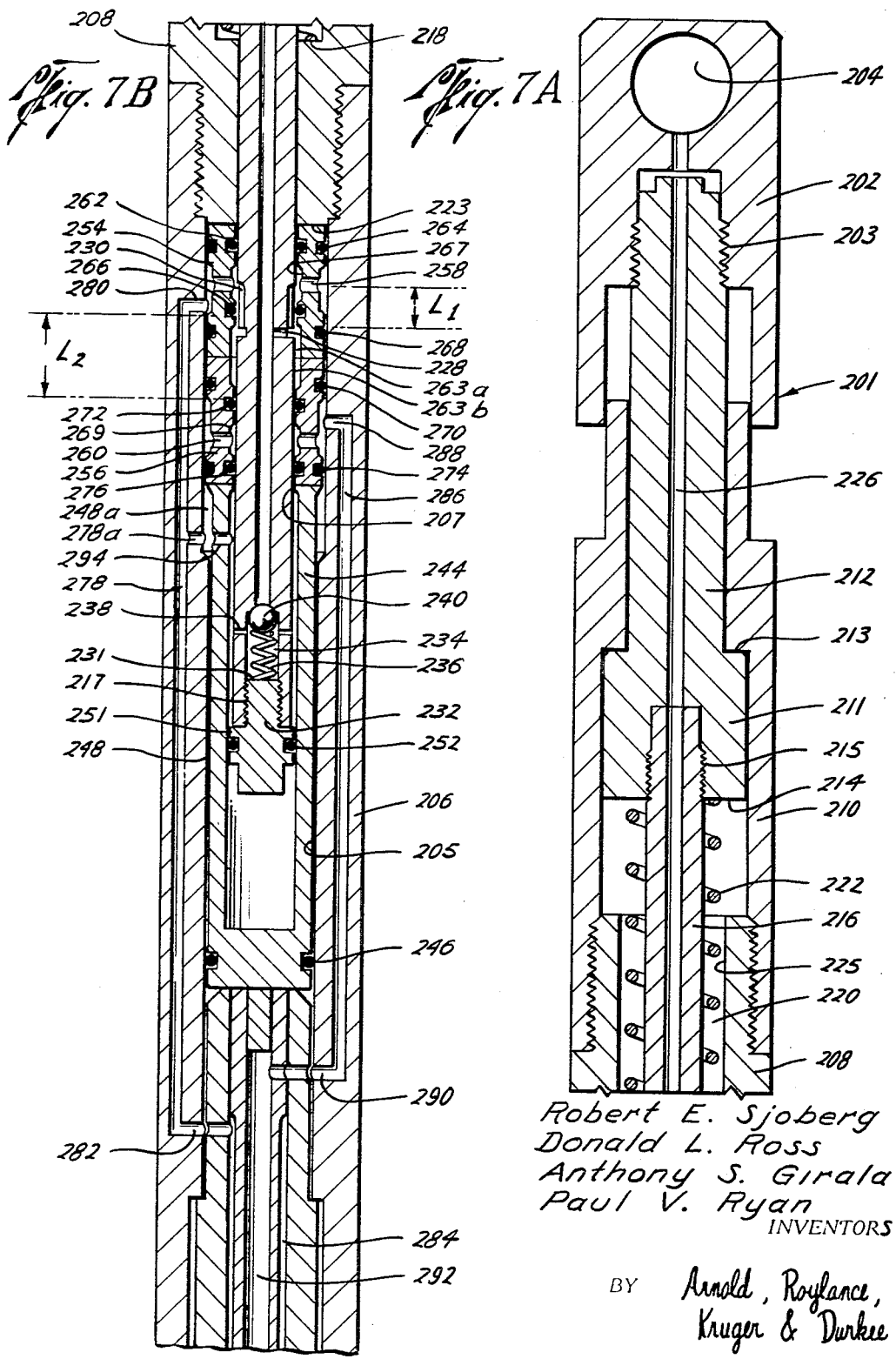

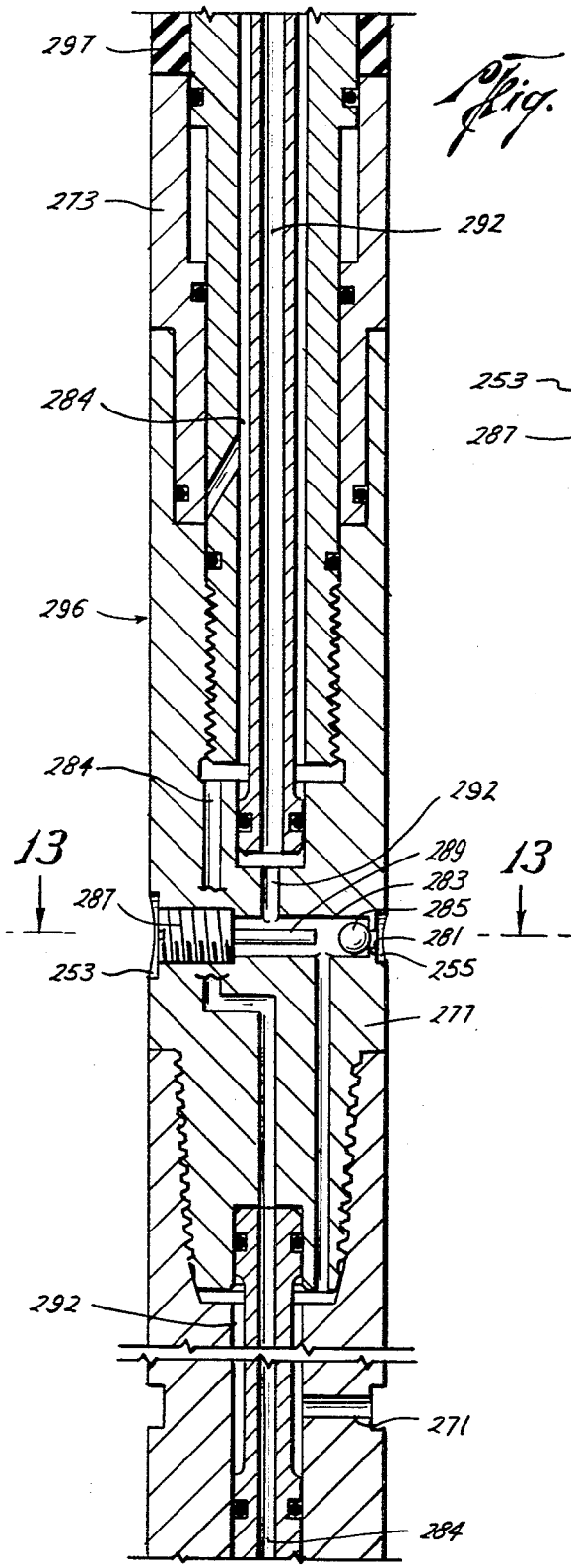

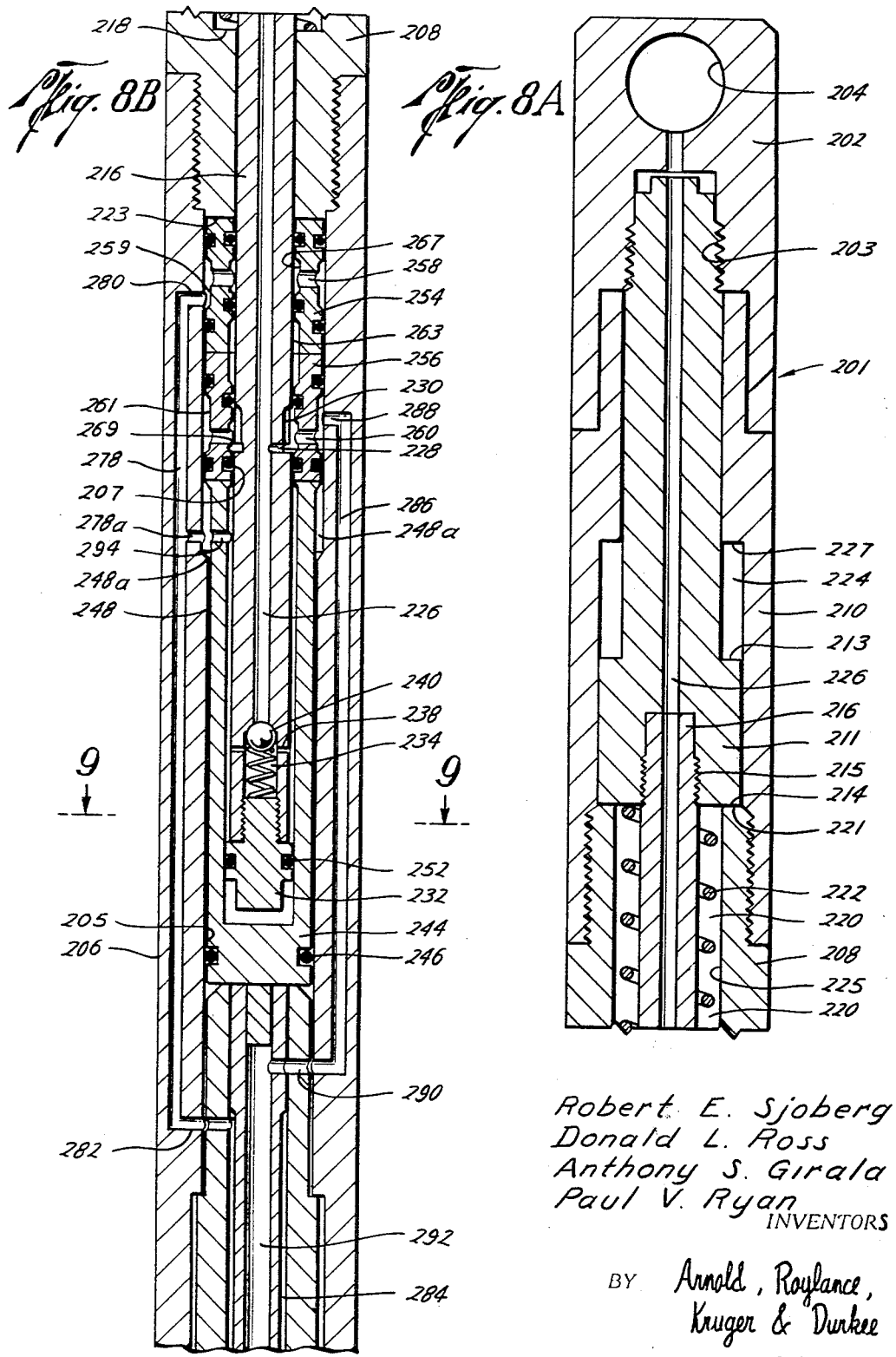

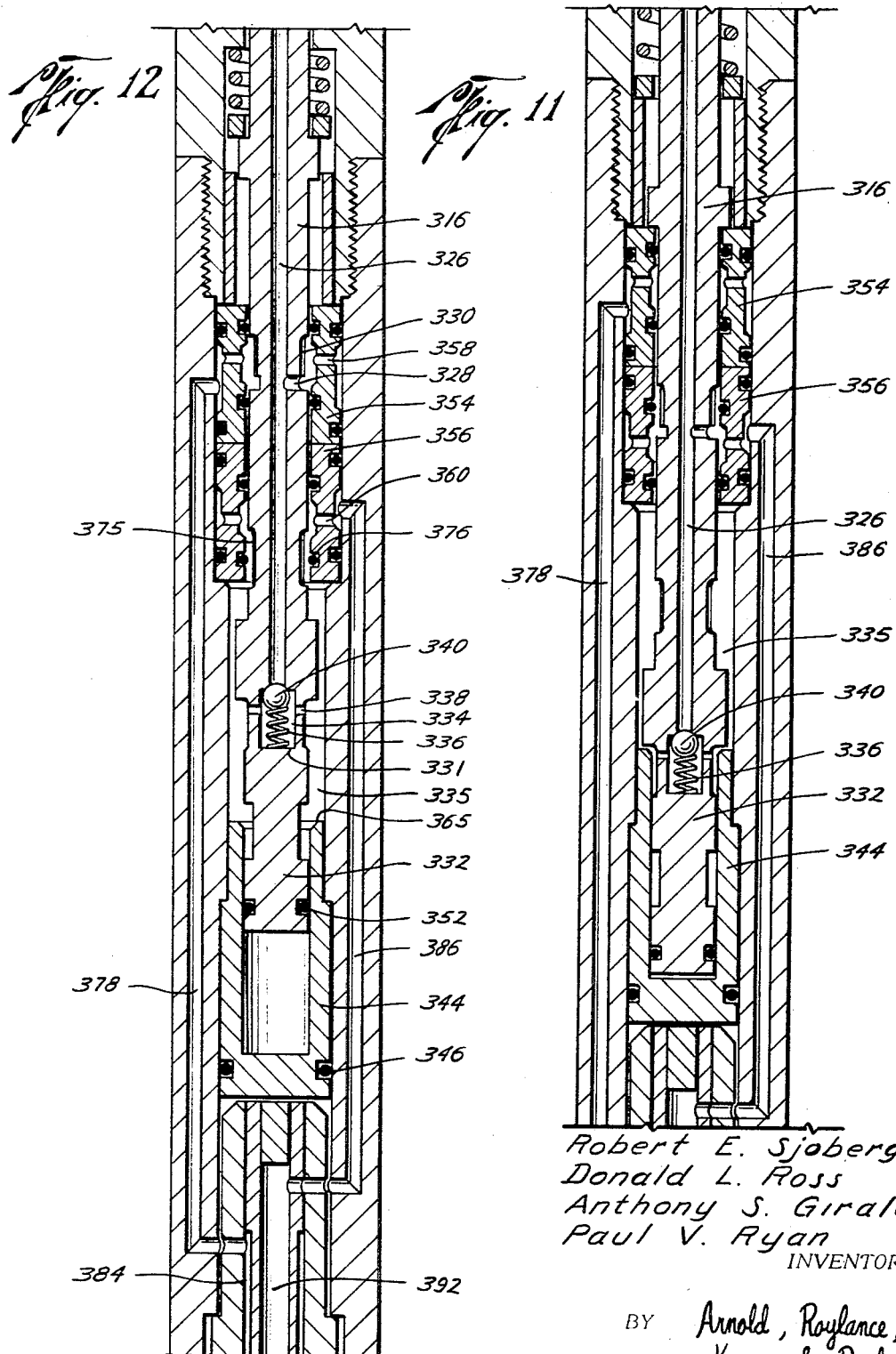

3,396,575
TESTING TOOL AND METHOD
Robert E. Sjoberg, Anthony S. Girala, Paul V. Ryan, and Donald L. Ross, Houston, Tex., assignors to Hydro-Test, Inc., Long Beach, Calif., a corporation of New Mexico
Continuation-in-part of application Ser. No. 513,192, Dec. 13, 1965. This application Jan. 30, 1968, Ser. No. 707,001
28 Claims. (Cl. 73—40.5)

ABSTRACT OF THE DISCLOSURE

A method is provided for testing a length of pipe for defects, as well as a testing tool apparatus suitable for so testing. The tool includes a couple of expandable resilient packers which, upon actuation, are adapted to move into sealing engagement with the inner wall of the pipe to be tested, thus defining an annular area of test. A port communicates with this annular area, and through this port testing fluid is introduced to the annular area and the area pressurized. Pressure measurements then reveal any defect in the tested area of the pipe.

The tool provided is actuated quickly by a very small amount of fluid. In various embodiments, the packers are adapted to be set independently or simultaneously. The packers may be left expanded until such time as the tool is to be moved for another test, and the test may be made at any desired pressure, including a pressure less than the pressure used to set the packers.

---

This application is a continuation-in-part of our copending application Ser. No. 513,192, filed Dec. 13, 1965, now abandoned.

This invention relates to a tool suitable for testing a length or section of pipe or tubing for leaks. The testing tool of this invention is particularly useful in testing for leaks in oil well pipe or tubing.

Well pipe such as tubing or casing may contain imperfections or damaged areas which will result in leakage of the high pressure fluids from the pipe. Therefore, it is the practice to test such pipe before and/or after it is run into the well.

Various tools have been developed to make such tests, and while many of these tools have proved successful, each of them has suffered from one or more serious disadvantages. The present invention provides a tool which is improved and more efficient than the tools of the prior art, and which operates in a manner different from the prior art tools.

It is an object of this invention, therefore, to provide an improved tool for testing for leaks in oil well pipe. It is a further object of the present invention to provide a tool suitable for testing oil well pipe which comprises two expandable packers which may be actuated into engagement with the length of pipe to be tested, wherein the packers may be set independently, and the packer which is first set may be sealed in its engaged position before the other packer is set.

A further object is to provide an improved testing tool comprising packers as above described wherein a source of fluid under pressure may be communicated with the exterior of the tool between the two packers, and wherein this source of fluid under pressure is independent of the source which is used to set the packers.

A further object is to provide a method for holding the tool in the pipe without injury to the internal surface of the pipe and without the use of secondary equipment, by leaving one or more packers expanded until such time that the tool is to be moved.

Another object is to provide an improved tool wherein the packers may be set very quickly, and by a small amount of fluid.

Still a further object of the invention is to provide an improved testing tool comprising packers as described above, wherein the tool may be readily altered so that the packers may be set either independently or simultaneously.

A further object is to provide an improved tool of the above-mentioned type which may be readily altered so that the packers may be set either independently or simultaneously, wherein such alteration may be realized by mere replacement of a small component part of the tool.

Another object is to provide an improved tool having a plurality of packers, wherein one set of packers may be set first, and introduction of a testing fluid will initially seal the path used to set the first packers, and then fill the annulus between the tool and the pipe to be tested with the tesing fluid.

Sill another object of the present invention is to provide, in one embodiment, a tool wherein two spaced apart packers may be set simultaneously by a small amount of fluid, and wherein fluid may be introduced through the same channel that is used to set the packers, to pressurize the annulus between the packers whereby the annulus is independent of the packers.

Another object of the invention is to provide a tool of the above-mentioned type wherein the packers can be pressurized in a closed system by small amounts of fluid, through a single opening in the tool which communicates with an outside source of fluid such as a hose.

A still further object is to provide in one embodiment a tool wherein the packers may be set and the annulus pressurized through a single fluid channel, and wherein after the test the pressure on the packers may be relaxed and then actuating fluid transferred into the annulus between the packers.

Another object is to provide a testing tool wherein the pipe to be tested may be tested at any pressure in the annulus, including pressures less than the pressure on the packers.

Yet another object of the invention is to provide a tool and a method of operation wherein the release of the packers is completely independent of the pressure in the annulus between the packers.

Brief description of the drawings

Other objects and advantages of this invention will be apparent to those skilled in the art. In order that the manner in which the foregoing and other objects are attained in accordance with the invention can be understood in detail, advantageous embodiments of the invention will be described with reference to the accompanying drawings, which form a part of the specification, and wherein:

FIGURE 1 is a fragmentary, diagrammatic view of a well having pipe therein, and illustrating an apparatus constructed in accordance with one embodiment of this invention in position for testing such pipe.

FIGURE 2A is a fragmentary, central, vertical cross-sectional view of the upper portion of the tool illustrated in FIGURE 1, showing details of the structure and arrangement of parts after the lower packers have been set.

FIGURE 2B is a view similar to FIGURE 2A of the next portion of the apparatus, this portion being a downward extension of the FIGURE 2A portion.

FIGURE 2C is a view similar to FIGURES 2A and 2B, this portion being a downward extension of the FIGURE 2B portion.

FIGURE 2D is a view similar to FIGURES 2A–C, this portion being a downward extension of FIGURE 2C.

FIGURE 2E is a view similar to FIGURES 2A–D, this portion being a downward extension of FIGURE 2D.

FIGURE 2F is a view similar to FIGURES 2A–E, this portion being a downward extension of FIGURE 2E.

FIGURE 3 is a view taken along the line 3—3 of FIGURE 2B.

FIGURE 4 is a view taken along the line 4—4 of FIGURE 2B.

FIGURE 5A is a view similar to FIGURE 2B, but illustrating the position of the various parts of the tool after the upper packers have been set.

FIGURE 5B is a view similar to FIGURES 2 and 2D, but illustrating the position of the various parts of the tool after the upper packers have been set, this figure being a downward extension of the FIGURE 5A portion of the tool.

FIGURE 6A is a fragmentary, central, vertical cross-sectional view of the upper portion of an apparatus constructed in accordance with an alternative embodiment of this invention.

FIGURE 6B is a view similar to FIGURE 6A of the next portion of the apparatus, this portion being a downward extension of the FIGURE 6A portion.

FIGURE 7 is a view similar to FIGURE 1, of another embodiment of the invention.

FIGURE 7A is a view similar to FIGURE 2A, illustrating another embodiment of the present invention;

FIGURE 7B is a view similar to FIGURE 7A of the next portion of the apparatus, this portion being a downward extension of the FIGURE 7A portion;

FIGURE 7C is a view similar to FIGURE 2D, this view being a downward extension of the portion of the tool shown in FIGURE 7B.

FIGURE 8A is a view similar to FIGURE 7A, showing the apparatus at another stage in the method of this embodiment;

FIGURE 8B is a view similar to FIGURE 8A of the next portion of the apparatus, this portion being a downward extension of the portion of the tool shown in FIGURE 8A;

FIGURE 9 is a view taken along the line 9—9 of FIGURE 8B.

FIGURE 10 is a view similar to FIGURE 2A of an upper portion of a tool constructed in accordance with another embodiment of this invention;

FIGURE 11 is a view similar to FIGURE 10, showing the FIGURE 10 apparatus at another stage in the method of this embodiment.

FIGURE 12 is a view similar to FIGURE 10, at still another stage in the method according to this embodiment of the invention.

FIGURE 13 is a view taken along the line 13—13 of FIGURE 7C.

*Description of the preferred embodiments of FIGURES 2–5*

Referring now more in detail to the drawings, a testing tool 1 constructed in accordance with one embodiment of this invention is illustrated which comprises generally a subassembly 2, a distributor valve body 3, first packer body 4, a plurality of connector bars, as illustrated at 5 and 6, and a second packer body 7.

Such a tool 1 is illustrated in FIGURE 1 in position to test a length of pipe 25 between the points A and B before the pipe is lowered into the casing 19 of an oil well. It is noted that the testing tool 1 is of generally cylindrical construction, of a length slightly longer than the section or length of pipe to be tested, and of a diameter slightly smaller than the inside diameter of the pipe to be tested. While it is recognized that the tool may be positioned in any number of ways, subassembly 2 will represent the top or upper end of the tool in its customary operating position, and, therefore, reference to such terms as "top," "bottom," "upper," and "lower" will be made accordingly for convenience of explanation in this description and the appended claims.

Subassembly 2 comprises a generally cylindrical body portion 8 having a diameter equal to the diameter of the tool, and a tubular extension 9 at the lower end thereof, the outside diameter of the tubular extension also being equal to the diameter of the tool. Body portion 8 has in the lower part thereof a cylindrical central bore 10 which extends along the longitudinal axis of the assembly. A tubing seat 16 is located at the upper end of bore 10 and is held in sealing engagement therein by the O-ring 17.

At the upper end of subassembly 2 is a recessed, internally-threaded female connector 11, whereby the tool may be hung from an externally-threaded hanger. Also located in subassembly 2 are a first opening or port 12 and a second opening or port 13, each of said ports adapted to be readily connected to a source of fluid under pressure. Port 12 is in fluid communication with a longitudinally extending channel which is located in the interior of bore 10, through channel 14. Port 13 is likewise in fluid communication with another longitudinally extending channel which is also located in the interior of bore 10 through channel 15. Each of said channels extends through the interior of the subassembly to a lowermost point adjacent the central bore 10.

Any suitable means may be employed to introduce fluid into the ports 12 and 13. For example, as clearly illustrated in FIGURE 2A, fluid under pressure may be injected into the ports 12 and 13 by means of a connector 28 having a couple of hose attachments 34 and 35 the housings of which fit into correspondingly-shaped transverse bores in the subassembly 2, and each attachment being connected to an internal conduit. These conduits 34a and 35a terminate in openings, each of which is surrounded by a couple of O-ring seals 85, 86 and 87, 88, and these openings connect with the ports 12 and 13. In this manner, fluid such as a gas or liquid under pressure may be introduced into the ports 12 and 13 merely by attaching flexible hoses from sources of fluid under pressure to the hose-attaching connection 34 and 35, and allowing the fluids to flow through the connector into the ports 12 and 13. Although the connector 28 is illustrated in FIGURE 2A as one part, it may desirably be so constructed that the attachments 34 and 35 are in separate parts.

A portion of the cylindrical central bore 10 in body portion 8 is internally threaded to receive the upper end of an externally threaded generally cylindrical valve neck 33. At its lower end, the valve neck 33 is flared radially outwardly to a tubular shaped section, which gives the lower part of the valve neck a somewhat plunger shape. The inner surface of this tubular portion is internally threaded to receive the externally threaded upper end of valve spool 32, with suitable sealing means such as O-ring 36 included around the top end of the spool. Valve spool 32 is of generally tubular configuration and extends at its lower end into the interior of distributor valve body 3.

At its lower end, the valve spool is externally threaded for attachment to a piston 40, which is generally cylindrical in shape, the piston having a central threaded bore in the top portion thereof, said bore being adapted to receive the valve spool. The piston thus presents an annular upper face 59, a flat circular lower face 44, and cylindrical side face 42.

As is readily apparent, the subassembly 2, valve neck 33, valve spool 32, and piston 40 are free for longitudinal movement along the tool only as a unit, the piston 40 being free for longitudinal movement within an open area 60 in the center of the distributor valve body 3.

Distributor valve body 3 is of generally tubular configuration, thus defining an outer surface 29, the diameter of which is equal to the diameter of the tool, and an inner surface 30. The inner surface 30 has a diameter which may conveniently vary from less than one-third the outside diameter to more than one-half the outside diameter. At any rate, a central bore 31 extends completely through the body 3. The bore 31 is concentric with the longitudinal axis of the tool, and is of a larger size in the lower portion 3b of the body than in the upper portion 3a. That is, the inside diameter of the tool is significantly greater in the lower portion 3b. A longitudinally extending tubular valve nut 47 having a radially outwardly extending annular flange 48 at the top end thereof snugly fits into the recess formed by the bore 31 and is threadedly secured to the inner surface 30 of valve body 3, the flange 48 resting on the annular upper surface of the valve body. Valve nut 47 may be considered the principal member of a family of tubular shaped abutting rings 64, 65, 66, 67, 68, and 69 each of said rings being separated by sealing means such as O-rings 53, 54, 55, 56, 57, and 58, and each of said rings being of I-shaped cross section and having a radially extending opening or port therein. Each of said openings provides fluid communication at least at times between certain of the longitudinal channels in the valve spool 32 and channels in the valve body 3. The valve nut 47 serves of course to hold each of the rings 53–58 in place.

Threadedly engaged with the upper portion of the valve body 3 is a generally tubular valve body extension 37, which has an outside diameter that is generally equal to the outside diameter of the tool. This extension fits around the lower part of the valve neck 33, and at its upper end is shaped similarly to the lower end of the subassembly 2. It will be understood that this extension is integral with the valve body 3, and hence, upon longitudinal movement of the subassembly 2 and connected parts, the upper part of the extension 37 will move into engagement with the lower part of the subassembly.

In the outer surface of the extension 37 may desirably be placed a "safety dog" 38 with operatively connected dowel pin 39. Of course, this is strictly an optional feature of the invention, and may be included merely to serve as a safety catch, that is, to insure that the tool does not slip and fall from the inside of the pipe being tested. See, for example, the position indicated in FIGURE 5A.

In longitudinally sliding engagement with the interior surface of valve nut 47 is the above-described valve spool 32, which engages the valve neck 33 at a point above the radial flange 48 of the valve nut.

At the uppermost part of the interior of the portion 3b of the valve body is the above-mentioned space 60, into which the piston 40 is slidingly positioned. It will be recognized that this space 60, which is merely the space defined by the bore 31 at this point, will be equal in diameter to the diameter of the piston 40, but will be slightly greater in length than the piston so that the piston may move longitudinally therein. The lower end of the space 60 is defined by the upper face 74 of an upwardly extending cylindrical portion 75b of the top packer body 4. Just above the face 74 is a vent from the space 60 to the area outside the tool through radial channel 61. Piston 40 is free for sliding longitudinal movement within the space 60 inside the valve body 3. Suitable sealing means, such as O-ring 41, are included between the piston 40 and the valve body 3 at its inner surface 30.

A couple of longitudinal channels concentric with the axis of the tool extend through the center of subassembly 2, valve neck 33 and valve spool 32. Central channel 23 extends along the longitudinal axis of the tool, and tubular shaped annular channel 24 is concentric with channel 23 and coextensive with it over most of its length. Radial channel 22 which is located near the top of valve neck 33 communicates with annular channel 24, thus allowing fluid communication between the annular channel 24 at its upper end and the channel 14 and to port 12, suitable sealing means such as the O-rings 20 and 21 being included on either side of the radial channel 22. Central channel 23 is in fluid communication at its upper end with port 13 in subassembly 2, through channel 15.

Each of the channels 23 and 24 is in communication with certain channels in the valve body 3 in the following manner: In a central portion of valve spool 32, annular channel 24 terminates in radially extending channel 46. Central channel 23 terminates at its lower end in radial channel 45 which passes the fluid from the channel 23 into the area immediately surrounding the valve spool 32 at this point.

The inside diameter of the valve body 3 between the channel 45 and the top face 59 of the piston 40 when the piston is in its uppermost position is very slightly larger than such diameter just above this point. This forms, in effect, a tubular shaped recess 43 which allows the fluid flowing in the central channel 23 to exert pressure, upon flowing through the terminal channel 45, on the upper face 59 of the piston 40. Consequently, the piston 40 may be moved longitudinally when the force exerted by the fluid pressure in the channel 23 reaches a certain value.

Valve body 3 contains a plurality of channels for fluid communication from the central channel 23 and the annular channel 24 to the lower sections of the tool. Different of these channels 49, 50, 51, 52 and 52a are adapted to communicate through the ported rings beneath the valve nut 47 with the central and annular channels at different times, depending on the exact position of the distributor valve spool. For example, in the FIGURE 2B position, channel 49 in valve body 3 communicates through the port in ring 66. Likewise, channel 50 communicates through the port in ring 68, channel 51 communicates through the port in ring 69, and channel 52 communicates through the ports in each of the rings 64 and 67 and, through extension 52a, through the port in ring 65. The channels 49, 50, 51, 52 and 52a are generally parallel to the longitudinal axis of the tool, but at their upper end (and 52 at its lower end) are inturned for communication through one of said ports.

As explained above, valve spool 32 contains radial channel 45, which communicates with central longitudinal channel 23, and radial channel 46 which is in communication with annular channel 24. Annular recesses or grooves 62 and 63 are also included in the outer surface of valve spool 32, each such recess being of sufficient width to provide for fluid by-pass around an O-ring seal. Thus, when the valve is in the position shown in FIGURE 2B, recess 63 allows for fluid passage around O-ring 57, so that there is fluid communication between channels 52 and 50. When the valve is in the actuated position illustrated in FIGURE 5A, the recess 62 allows for fluid by-pass around the O-ring 55, and thus allows fluid communication between the channels 52 and 49 through extension 52a.

The lower end 3b of distributor valve body 3 is provided with a tubular extension at the end thereof. The channels 49, 50, and 51 each enter this area and are inwardly turned perpendicular to the longitudinal axis of the tool in such a manner as to each connect with one of a corresponding set of channels in the first packer body 4, the top of which sealingly fits into the inner surface of the tubular extension of the lower portion 3b of the valve body. This first, or top, packer body 4 contains an elongated central cylindrical shaft 75 having a maximum diameter equal to the diameter of the tool, which preferably takes the form shown in FIGURES 2C and 2D. As viewed there, a central portion of the shaft 75a is equal in diameter to the diameter of the tool. At its upper end 75b, however, the diameter of the tool is reduced so that it is adapted to fit into the tubular extension formed by the lower part 3b of the valve body 3. An intermediate portion of the shaft 75c, located just below the maximum diameter section 75a, is also reduced in diameter, thus forming a radially extending annular shoulder 90.

Surrounding the central shaft in this area 75c, are a plurality of expandable packers 76 of tubular configuration arranged in abutting relationship with each other. The packers 76 are constructed of a resilient material such as hard rubber or a rubber substitute, and are capable of compression and expansion both longitudinally and radially.

At the lower end of the central shaft 75 is an area of further reduced diameter 75d, this area forming another radially extending annular shoulder 91 at the point of its juncture with the portion 75c. The lower extremity of this portion is externally threaded to receive a tubular cylinder 77 which has a diameter approximately equal to the outside diameter of the tool. The cylinder 77 extends below the lowermost portion of the shaft 75, and has an internally threaded tubular extension which enables connection to be made between the shaft 75 and the first of one or more connector bars 5. Adjacent the upper end of the cylinder 77, which is preferably constructed with a tubular-shaped recessed area at the inner surface thereof at its upper end, is a matingly shaped generally tubular piston 80 adapted for longitudinal movement between the cylinder 77 and the packers 76. The piston 80, as viewed in FIGURE 2D, is also preferably constructed with a tubular shaped recess at its inner surface at the upper portion thereof. This allows the inner surface of the piston to fit flush against the shaft 75 in each of its portions 75c and 75d, which are of course of different diameter. It also forms a radially extending annular shoulder 92 on the piston. The outer surface of the piston is, in the upper portion thereof, of a diameter equal to the diameter of the tool and, in the lower portion thereof, of a diameter approximately equal to the diameter of the tubular shaped recess in the upper part of cylinder 77.

When the tool is in the FIGURE 2D position, there is an annular area 89 between the shoulder 92 of the piston 80, and the shoulder 91 of the shaft 75. It is readily recognized that this area will decrease as the piston 80 is moved vertically upward, and that the area will vanish should the shoulder 92 of the piston abut the shoulder 91 of the shaft 75, thus ending upward movement of the piston. The volume originally occupied by the area 89 when the tool is in the FIGURE 2D position will be reduced when the piston has been moved to the position illustrated in FIGURE 5B, and an area 97 appears between the cylinder 77 and the lower end of the piston 80.

Of course, suitable seals such as the O-rings 81, 82, 83, and 84 may be positioned at appropriate points along the surfaces of piston 80, cylinder 77, and shaft 75 to insure sealing engagement of the piston as it moves longitudinally along the tool.

A suitable tubular spacer 78 is inserted between the upper end of the piston 80 and the lower member of the packers 76, and likewise a suitable tubular spacer 79 may be conveniently positioned between the upper packer and the shoulder 90 of the shaft 75.

The shaft 75 may be machined in any convenient manner, as illustrated at 93, to adapt the apparatus for receiving tools for makeup. Also, a cleat may be inserted at 93 to signify to the operator when the tool is in position for testing.

Disposed along the longitudinal axis of the shaft 75 are the three concentric channels 94, 95, and 96. Channel 94 is located at the center of the shaft, and this conduit extends completely through the length of the shaft. It is in communication at all times at its upper end with the channel 50 in the distributor valve body 3, and is in communication at its lower end with a corresponding channel in the top of a connector bar fitting 101 and thence to the top connector bar 5. Longitudinally-extending tubular-shaped channel 95 is concentric with channel 94, but is disposed radially outwardly from that channel. The channel 95 is in fluid communication at its upper end with the channel 51 in the valve body 3 at all times. At the lower end of the shaft 75, the channel 95 is angled outwardly from the longitudinal axis of the shaft as at 95a to form a convenient communication through fitting 101 with a corresponding channel in the top connector bar 5. Longitudinally-extending tubular-shaped channel 26 is also concentric with channels 94 and 95, and is disposed radially outwardly from each of these channels. The channel 96 is in fluid communication at all times at the upper end of the shaft 75 with the channel 49 in the valve body 3; at its lower end, the channel 96 is angled outwardly from the longitudinal axis of the tool and is in communication at this point with the inner surface of the piston 80, at the lower end of the piston and adjacent its juncture with the cylinder 77. In this manner, fluid communicated through the channel 96 under pressure may be advantageously employed to separate the piston 80 from the cylinder 77, and consequently move the piston 80 longitudinally upwardly to set the packers. Of course, suitable seals such as the O-rings 70, 71, 72, and 73 are included around the upper portion of the packer body 4 at the point where the channels 94, 95 and 96 communicate with the inwardly turned lower extremities of the channels 49, 50, and 51.

Any suitable number of connector bars 5, 6 may be attached to the lower portion of the shaft 75 at its lower end in any convenient manner as by the connector bar fitting 101. The fitting 101 is generally cylindrical in configuration and has a central portion of larger diameter than the rest of the fitting. The diameter of this central portion is equal to the diameter of the tool. The upper smaller diameter portion 102 of the fitting is externally threaded to receive the correspondingly threaded portion of the tubular extension of the cylinder 77. Channels 94 and 95 continue longitudinally through the fitting 101, connecting at the upper end of the fitting with the corresponding channels in the central shaft 75, and at the lower end with the corresponding channels in the top connector bar 5. The lower portion of the fitting 101 is a mirror image of the upper portion, the externally threaded lower portion 103 being adapted to receive a matingly shaped portion of the top connector bar.

Similarly-shaped connector bar fittings will be placed between each connector bar and the next lower connector bar.

At the bottom of the tool is a second packer body 7. This second packer body is much like the top packer body 4 described above. It desirably comprises a longitudinally extending central shaft 110. The lower end of this shaft, which is designated as 110a, has a diameter equal to the diameter of the tool. A section of reduced diameter 110b is located above this lower section, radially extending annular shoulder 125 being defined at the juncture of these two sections. A section of further reduced diameter 110c is located at the upper end of the tool, another radially extending annular shoulder 126 being defined at the juncture of sections 110b and 110c. The section 110c is externally threaded at its upper extremity in order that it may be threadedly engaged with a downwardly extending tubular extension of the cylinder 112 which, in turn, secures the shaft 110 to the bottom connector bar fitting 105.

The bottom connector bar fitting 105 is much like the other connector bar fittings, except that the channel 95 doe not extend completely therethrough, but rather terminates intermediate the ends of the connector bar fitting and communicates with the area outside the tool through the port 106. Thus, only the channel 94 enters the lower packer body 7.

Surrounding the section 110b of the shaft 110 are a plurality of resilient tubular packers 111 similar to the packers 76 described above. Between the lower packer and the shoulder 125 of the shaft 110 is a tubular spacer 113, and above the top packer is a similarly-shaped spacer 114. Above the spacer 114 and slidingly mounted beneath the cylinder 112 is a longitudinally movable generally tubular piston 115 having a configuration similar to the piston 80 of the packer body 4.

Central channel 94 enters the shaft 110 and terminates in radially outwardly extending channel 127 which communicates with the inner surface of the piston 115 at its upper end. In this manner, fluid under pressure entering the channel 94 will communicate with the inner surface of the piston 115 to thereby move the piston longitudinally downwardly to set the packers 11. There is an area 123 between the shoulder 128 of the piston and the shoulder 126 of the shaft 110. After the piston has been moved downwardly to the FIGURE 2F position and the bottom packers set, the piston will occupy most of this area and an area 122 will appear at the upper end of the piston between it and the cylinder 112, and this area will be occupied by fluid from the channel 94.

Suitable seals, such as the O-rings 116, 117, and 118 are desirably placed around the piston 115 in order to maintain sealing engagement upon longitudinal movement of the piston. Further O-rings 119 and 120 may be placed in any convenient manner around the portions of the shaft 110 near the entry and termination of the channel 94.

At the lower extremity of the tool, suitable means may be positioned to place the tool in a hole, or to suspend other tools from the present apparatus. It may be desirable to set the bottom of the tool on slips. One such illustrative means is indicated by the internally threaded female connector 124. A swab-type cup or other suitable cup may be placed on the bottom of the tool to precede the tool into a pipe in a conventional manner.

In the foregoing description, the diameter of certain components has been defined as equal to the diameter of the tool. It is readily seen that this diameter is not usually critical for most of these parts, it being only necessary that the outside diameter extend radially no farther into the hole than the outermost portions of the packers 76 and 111. It is important, however, that the tool be of sufficient diameter that the expansion of the packers in a radial direction will be such that sealing engagement will be realized with the inside diameter of the pipe into which the tool is placed.

Also in the foregoing description, it will be understood that the term "radial" means along the radius of the elongated tool. That is, perpendicular to the longitudinal axis of the tool.

*Operation of the embodiment of FIGURES 2–5*

The operation of the tool as illustrated may best be explained by reference to the accompanying drawings.

In FIGURE 1, the tool is illustrated just after it is inserted in the length of pipe 25 to be tested. The tool is positioned therein in such a manner that the upper packer body 4 is above the length to be tested, and the lower packer body 7 is below the length. It is recognized, of course, that the tested area of the pipe will be exactly that area between the upper packers 76 and the lower packers 111, i.e., the area between points A and B in FIGURE 1. Thus, the length of the tool between these packers may be adjusted conveniently by inserting or removing connector bars such as 5 and 6.

Assume now that it is desired to test the pipe 25 between the upper packer body 4 and the lower packer body 7, and that the tool of the FIGURES 2A–F embodiment is being used.

First it will be desired to set the lower packers 111. This is done by first introducing a fluid such as water into the upper port 12. As may be readily seen in FIGURE 2A, the fluid will flow from the port 12 through the channel 14 in the subassembly 2 and thence into the annular channel 24 through the valve neck and the valve spool. Then, the fluid will flow out of annular channel 24 at its lower end through radial channel 46. In the FIGURE 2B position, the fluid can now communicate with channel 52, around recess 63 in the valve spool, and then with channel 50 in the distributor valve body 3. Since the channel 50 is in fluid communication with the central channel 94 extending completely through the lower part of the tool, the fluid will thence enter this channel and will finally act, through radial channel 127, on the top of the piston 115. The pressure exerted by the fluid will cause the piston 115 to move longitudinally downwardly, occupying the previously empty space 123. Movement of the piston 115 in this direction will cause the resilient packers 111 to be compressed and expand radially until they are in sealing engagement with the inner wall of the pipe 25 to be tested, as illustrated in FIGURE 2F.

The bottom packer 111 may now be locked in sealing engagement by introduction of high pressure fluid through the port 13. This fluid will pass into the central channel 23 through the valve neck and valve spool 32. Since it is seen from FIGURE 2B that the fluid pressure in the channel 23 acts on the piston 40 to move it downwardly, and since the piston is free for movement in this direction, the piston 40 will begin to move longitudinally downwardly as soon as the fluid pressure acting on the upper face 59 of the piston exceeds the pressure exerted by the air in the space 60 on the rear face 44 of the piston. As this happens, the piston along with the valve spool, valve neck and subassembly will assume the position illustrated in FIGURE 5A. In this position, it is readily seen that the annular channel 24 no longer is in fluid communication with the central channel 94 in the lower part of the tool. Hence this channel 94 is sealed off, and the bottom packers are sealed in position.

With the valve spool now in the FIGURE 5A position, the fluid being passed into the port 13 will communicate, through the radial channel 45 at the lower end of the central channel 23 in the upper part of the tool, with the channel 51 in the distributor valve body 3. Since this channel 51 is in communication at all times with the channel 95 in the lower part of the tool, the fluid will pass through this channel and out the port 106 in the bottom connector bar fitting. This fluid will then begin to fill the annulus between the tool and the inner surface of the pipe to be tested above the lower packers 111, displacing air, mud, or other material which may be therein. Such displacement is extremely important since without it it becomes difficult to obtain accurate pressure drop readings, especially when small leaks are present. When the fluid begins to spill over, entry of fluid into the port 13 is terminated, and fluid is again introduced into the port 12.

But the valve spool is still in the FIGURE 5A position. So now, instead of fluid flowing through the annular channel 24 communicating through the channel 52 to the channel 50 in the distributor valve body, that communication is established instead through the channel 52, extension 52a, recess 62, and thence to the channel 49. As will be readily seen and as explained above, the channel 49 is at all times in fluid communication with the channel 96 in the lower part of the tool. Fluid pressure in the channel 96 communicates at its lower end 96a with the bottom of piston 80. Such pressure acts, of course, to move the piston 80 longitudinally upwardly to occupy the previously empty space 97, until the shoulder 92 of the piston abuts the shoulder 91 of the shaft 75 or can move no higher. This longitudinal movement of the piston 80 causes compression of the packers 76 and the consequent expansion of these packers in a radially outwardly direction until the packers engage the inner wall 26 of the pipe 25 to be tested, as seen in FIGURE 5B. After an effective seal has been formed here, the path of fluid flow just described is sealed in any convenient manner, as by plugging port 12. The tool is now firmly sealed to the pipe to be tested at both the upper and lower packers, and the area of the pipe between these points may be tested.

This is done by terminating flow of the fluid through the port 12, and once again introducing testing fluid under pressure into the port 13. As explained above, the fluid entering the port 13 will be emitted at the lower end of the tool through the outlet port 106 in the bottom connector bar fitting when the tool is in the FIGURE 5A, 5B position. This fluid will now pressurize the annulus 27 between the testing tool and the inner surface of the pipe to be tested between the upper and lower packers. The path of fluid to this annulus is now sealed in any convenient manner, as by plugging the port 13, and the pipe 25 is tested for leaks by measuring the pressure drop in the annulus.

It is recognized that the pressure required to set the packers will be significantly less than the testing pressure. But the increased pressure in the annulus acts to more firmly hold the packers in place. When the high annulus pressure is released, however, the packers will still be securely held by the pressure which originally set them.

In this manner, the packers are firmly set and secured in locking engagement with the inner surface of the pipe to be tested until it is desired to remove or reposition the tool. The inner surface of the pipe, which may be plastic coated, will not be injured by the packers as it might be by some secondary equipment such as slips.

After this section of pipe has been tested, the pressure in the annulus is released, the next section or sections of pipe to be tested is added, the tool is pulled onto such added section thus lifting the distributor valve spool and thereby releasing the pressure on the packers, and the above operations repeated for each such section to be tested.

Convenient means such as a cleat may be employed to indicate to the operator when the desired section to be tested is in position between the two packers. If the cleat is used, the tool is lowered into the pipe 25 until the cleat is adjacent the top of the pipe. The first section is tested in the manner above described, and then the cleat is removed with the bottom packer still in place. The next section of tubing to be tested is added, and the bottom packer is collapsed by pulling up the distributor valve and lifting the tool into the added section; then the above operation is repeated.

The embodiment of FIGURE 6

If the tool is constructed in accordance with the FIGURE 6A embodiment, it is easily seen that fluid entering the port 12 will act to set both the upper packers 76 and the lower packers 111 at the same time. In this embodiment, the recesses 62a and 63a in the valve spool, which is here designated 32a, are spaced so that, in an operative position corresponding to the FIGURE 2B position, there is communication around the O-rings 55 and 57 at the same time. This allows fluid flowing in the channel 52 to communicate, through the channel 52a, to the channel 49 while at the same time permitting communication also from the channel 52 to the channel 50. Since fluid flow through the channel 49 acts to set the lower packers, and fluid flow through the channel 50 acts to set the upper packers, it is readily seen that both the upper and lower packers may be simultaneously set in this manner. Of course, a single fluid entering the tool through the port 12 and the annular channel 24 precipitates such setting of the packers. Entry of fluid through the port 13 acts to depress the piston 40 to seal each the upper packers and the lower packers in position, and thence to emit fluid for testing through the port 106 into the annulus 27.

The concentric channels 94, 95 and 96 may be replaced, if desired, by flexible conduits, as illustrated in FIGURES 6A and 6B. As viewed in these embodiments, these channels in the lower part of the tool have been replaced by one central bore 108, and a couple of flexible conduits 107 and 109. As can be readily seen, these conduits and bore perform the function of the channels 94–96. The conduit 107 is in communication at its upper end (see FIGURE 6A) with the channel 50 in the distributor valve body 30; the bore 108 is in communication at this point with the conduit 51 in the valve body; and the conduit 109 is in communication here with the conduit 49.

Operation of the embodiment of FIGURE 6

If it is desired to set both packers simultaneously, the tool illustrated in the FIGURE 6A embodiment may be employed. The operation in this instance will be much like the operation described above in connection with the tool of the FIGURES 2A–F embodiment. However, in the FIGURE 6A embodiment, pressurizing through the port 12 will set both the upper packers 76 and the lower packers 111, because—as it will be readily seen—communication of fluid through the annular channel 24 through the port 12 will result in communication through both the channel 49 and the channel 50 in the valve body 3. Thence, flow will be directed through each of the channels 94 and 96 in the lower part of the tool simultaneously. Testing fluid is then introduced to the annulus 27 between the already set upper and lower packers in the same manner as described above.

It is seen that the FIGURE 6A embodiment is realized simply by replacing the valve spool 32 of FIGURE 2B with a similarly shaped valve spool 32a having recesses 62 and 63 in the valve spool 32. Thus, replacement of this simple and inexpensive part readily changes the operation of the complete tool.

The FIGURE 6A embodiment is preferably used when the pipe is already filled with fluid, and fluid is carried with the tool when the tool is repositioned.

The embodiment of FIGS. 7–9

The tool 201 provided by the FIGS. 7–9 embodiment is again elongate and generally cylindrical in overall configuration, for fitting into tubular pipe to be tested. The tool 201 comprises generally an upper body portion 202, a valve body portion 206 and valve body extensions 208 and 210, and a lower body portion 296, all of which are concentrically positioned along the longitudinal axis of the tool and have an outside diameter substantially equal to the overall outside diameter of the tool. Lower body portion 296 includes a couple of resilient packers 297 and 299, and packer setting means [for example, of the type shown in connection with the FIGURE 2 embodiment], such means for the packer 297 being the piston 273 in FIGURE 7C.

The valve body 206 and valve body extensions 208 and 210 are each formed with a central bore 207 extending along the longitudinal axis thereof. In this bore is slidingly mounted a valve spool 216 which is operatively connected to the upper body portion 202.

Upper body portion 202 has a threaded central bore 203 to receive a valve neck 212 which is disposed along the longitudinal axis of the tool. Valve neck 212 terminates at its lower end in an outwardly flared portion 211 which forms an upper radially extending shoulder 213 and a lower radially extending shoulder 214. The lower end of the outwardly flared portion 211 is formed with a central bore 215 which is internally threaded to receive an upper matingly threaded portion of valve spool 216.

At its lower end opposite the valve neck 212, the generally cylindrical valve spool 216 is provided with a central bore 217, the lower portion of which is threaded. A piston 232, at least one portion of which has a larger diameter than the spool 216 (as will be more fully explained below) is joined to the spool 216 by means of threaded engagement with the threaded portion of bore 217. The portion of bore 217 just above the piston forms a small cylindrical cavity 234 into which is positioned a check valve arrangement which desirably takes the form of a ball 240 and a coil spring 236 between the ball 240 and the top of piston 232.

Valve spool 216, valve neck 212, and upper body portion 202, which are operatively connected and hence move as a unit, each have along the central longitudinal axis thereof an upper central longitudinal channel 226. Channel 226 terminates at its upper end in an opening 204 in the upper body portion 202, through which fluid may be introduced into the tool.

The central fluid channel 226 terminates at its lower end into the cavity 234, the lower terminus of channel 226 defining a port. The spring 236 acts to urge the ball check valve 240 to its uppermost position, thereby to close off the lower port in the channel 226 and thus prevent fluid communication between the channel 226 and the cavity 234. However, when the pressure in the channel 226 above the check valve 240 is sufficiently great, the ball check will be depressed into the cavity 234 and fluid communication will be thereby established.

At a point spaced above the cavity 234, the valve spool 216 includes a radial channel 228 connecting the central channel 226 to the exterior of the spool. Radial channel 228 is in fluid communication with a plurality of slots 230 having a length $L_1$, the slots being in alignment so that each extends the same longitudinal distance from the channel 228.

Valve body member 206 includes a couple of longitudinally extending fluid channels 278 and 286.

Longitudinal channel 286 is in fluid communication, through radial extenison 290 at the lower end thereof, with a lower central longitudinal channel 292 in the lower portion of the tool. Longitudinal channel 292 communicates through a port 271 with the annual area between the packers 297 and 299 in the manner generally illustrated in FIGS. 2D, 2E, 2F as described above in connection with that embodiment. (It will be readily understood that the lower portion of the tool can be readily altered to have the central channel 292 communicate with the annular area, or set the packers, whichever is desired.)

Longitudinal channel 278 is in fluid communication, through radial extension 282 in the lower end thereof, with an annular channel 284 in the lower portion of the tool. The fluid channel 284 is concentric with the central channel 292, and fluid under pressure flowing through the channel 284 is effective to set the packers 297 and 299, again as described in connection with FIGS. 2D, 2E, and 2F. Channel 278 includes a radial portion 278a, which extends from channel 278 to the inner surface of the valve body at bore 205 at a point below the ring 256.

It is seen that at all times the fluid channel 286 in the valve body 206 is in fluid communication with the channel 292 in the lower portion of the tool; and at all times the fluid channel 278 in the valve body 206 is in fluid communication with the channel 284 in the lower portion of the tool.

At least a portion of the valve body 206 may desirably be formed, as it is in the FIGURES 7–9 embodiment, with a central bore 205 somewhat larger than the bore 207. Into the bore 205 are positioned annular elements having an outer diameter substantially equal to the diameter of the bore 205, and an inner diameter substantially equal to the diameter of the bore 207. These annular elements are designed to selectively transmit fluid flow from the longitudinal channel 226 in the valve spool to the fluid channels 278 and 286 in the valve body, and thence to the fluid channels 284 and 292 in the lower part of the tool, to thereby set the packers 297 and 299, and to pressurize the annular area between the packers.

Such elements may desirably comprise the rings 254 and 256, and the elongate cylinder 244.

Ring 254 has a radial channel 258 approximately centrally disposed therein. In the outer surface of ring 254 at the channel 258, a shallow annular groove 259 is cut into the ring from the channel 258 to a point longitudinally spaced a short distance downward from the channel. Longitudinal channel 278 in valve body 206 is in fluid communication, through radial extension 280 at the upper end thereof, with the radial channel 258 of ring 254, through the groove 259. In this manner, fluid may be transferred through the ring 254 into the channel 278 and thence into the packer-setting channel 284 in the lower portion of the tool. In the inner surface of the ring 254 at the radial channel 258 is another shallow annular groove 267, for communication of fluid in the channel 258 a short distance on either side of the channel at the outer surface of the spool 216.

Ring 256, positioned just beneath ring 254 within the valve body, also contains a radial channel 260, approximately centrally disposed therein. A small annular groove 261 in the outer circumferential face of the ring extends from the radial channel 260 a short distance upward from the channel. Longitudinal channel 286 in the valve body 206 communicates with the channel 260 in ring 256 through inturned radial portion 288 of the channel 286, and through the shallow groove 261. In this manner, fluid may be transferred through the ring 256 to the channel 286, and thence to the annulus-pressurizing central channel 292 in the lower portion of the tool. In the inner surface of ring 256 at the radial channel 260 is another shallow annular groove 269, for communication of fluid in the channel 260 a short distance on either side of the channel at the outer surface of the spool 216.

Suitable sealing means are included on each side of the radial channels in the rings 254 and 256. Such sealing means desirably comprise: O-ring 262 and 266 on the inner circumferential face of the ring 254 on each side of the radial channel 258; O-rings 264 and 268 on the outer circumferential face of the ring 254 on each side of the channel 258; O-rings 272 and 276 on the inner circumferential face of ring 256 on each side of the radial channel 260; and O-rings 270 and 274 on the outer circumferential face of the ring 256 on each side of the radial channel 260.

The distance $L_2$ between the O-rings 266 and 272 is greater than the distance $L_1$.

A shallow groove 263 may be provided in the inner circumferential face of the rings 254 and 256 between the O-rings 266 and 272. The groove 263 is comprised of portion 263a in ring 254 and portion 263b in the ring 256. This groove serves to facilitate the flow of fluid from the radial channel 228 of the valve spool around one of the O-rings 266 or 272 into the radial channels of one of the rings 254 or 256, when the groove is positioned adjacent one of these O-rings.

Positioned just beneath the ring 256 within the valve body 206 is the elongate annular cylinder 244. At least a portion of the cylinder 244 has a diameter slightly less than the diameter of the bore 205 in valve body 206, to form an annular longitudinally extending fluid channel 248, an upper enlargement of which is designated 248a. It will be readily understood that the diameter of the bore 205 is not necessarily constant throughout the valve body 206; for example, in the FIGS. 7–8 embodiment, the diameter of bore 205 is slightly less in the region adjacent the cylinder 244 than in the region adjacent the rings 254 and 256. Suitable sealing means such as O-ring 246 may be included in the outer circumferential face of cylinder 244, to prevent fluid passage from channel 248 to a point beneath the cylinder 244.

The inner diameter of the cylinder 244 at the O-ring 252 is slightly larger than the diameter of the spool 216 where it passes through O-ring 276 in ring 256. In this manner, an elongate longitudinally extending annular channel 250 is provided between the inner circumferential face of the cylinder 244 and the adjacent outer circumferential face of the valve spool 216, extending longitudinally between the O-ring 276 in ring 256 and O-ring 252. Channel 250 is concentric with the axis of the tool and with the annular channel 248 and central channel 226.

Fluid communication between the longitudinal channel 250 and the cavity 234 near the lower end of the valve spool, is provided by radially extending channel 238 in the valve spool. This channel enters the cavity 234 at a point just below the check valve 240 when the check valve is in its uppermost position.

Cylinder 244 has a radial channel 294 longitudinally aligned with the channel 278a in the valve body.

Fluid communication between the annular channel 250, annular channel 248 (through portion 248a), and longitudinal channel 278 in the valve body 206, is provided by the radial channels 278a and 294, which join these respective longitudinally-extending channels.

As noted above, a piston 232 is provided at the bottom of the valve spool 216. This piston has a portion 251 of diameter larger than the mean diameter of the rest of the valve spool 216. The diameter of the portion 251 is substantially equal to the inner diameter of the cylinder 244. A suitable seal such as O-ring 252 is positioned in the outer circumferential face of portion 251 of the piston 232 to prevent the passage of fluid behind the piston.

An area 233 is defined as the cross-sectional area of the longitudinally extending annular channel 250, and consequently is the area upon which fluid in the channel 250 acts. This area, as will be understood by reference to the above description in connection with the channel 250, is between the inner diameter of the cylinder 244 and the outer diameter of the spool 216.

As will be readily understood, fluid pressure acting in the channel 250 thus acts to urge the piston (and hence the valve spool connected thereto) downwardly within the cylinder 244.

Urging means are also included to generally urge the valve spool 216 upwardly. Such means desirably comprise a coil spring 222.

It is advantageous to provide the valve body and its associated structure in plural parts, as in the FIGS. 7-9 embodiment. Here it is seen that positioned above the valve body 206, and threadedly connected thereto, is valve body extension 208. Extension 208 comprises a central portion having a diameter equal to the mean diameter of the tool, and end portions of reduced diameter. Each of the reduced diameter portions is externally threaded, the lower one for receipt of a matingly threaded portion of valve body 206, and the upper one for receipt of a matingly threaded portion of valve body extension 210. Central bore 207, through which is disposed the valve spool 216, extends completely through the extension 208.

The lower end of the valve body extension 208 presents an annular face 223 which abuts the upper surface of annular ring 254; the upper end of the valve body presents an annular face 221. A counterbore 225 in the top of valve body extension 208 forms an annular opening 220 in the upper portion of extension 208 around the valve spool 216. The lower extremity of opening 220 is defined by annular shoulder 218 of the extension 208.

As previously noted, valve neck 212 is provided with a flared portion 211 of larger diameter than the valve spool 216, at the lowermost portion of the valve neck. And the lower end of this flared portion 211 presents the annular shoulder 214.

The urging means such as the coil spring 222 is desirably positioned within the opening 220, one end of the spring bearing on the shoulder 218, and the other end bearing on the shoulder 214 of the valve neck 212.

The portion 211 of valve neck 212 is free to ride up and down in an opening 224 created by providing the valve body extension 210 with a central bore of enlarged diameter. At its uppermost position, the shoulder 213 of the flared portion 211 may engage a radially extending shoulder 227 of extension 210; at its lowermost position (as seen in FIG. 8A), the shoulder 214 is adapted to move into contact with the upper face 221 of the valve body extension 208.

In this manner, it is readily seen that the spring 222 urges the valve spool 216 and associated structure upwardly, by bearing against the shoulder 214 of valve neck 212. Any suitable spring tension might be employed, depending upon the pressure differential desired to overcome such tension; as one example, it has been found desirable to use approximately twenty pounds of preload pressure in some contexts.

As will be readily seen, the valve spool 216 is free for limited longitudinal movement, by movement of the portion 211 from a position of engagement with the surface 221 to a position of engagement with the surface 227. And as will be more fully explained below, movement of the valve spool longitudinally provides for selective transfer of the fluid from central channel 226 to various of the channels in the lower portion of the tool.

As mentioned above in connection with the embodiment of FIGURE 2, it is very difficult to make accurate test measurements if there is significant air pressure in the annulus between the packers after the packers are actuated into engagement with the inner wall of the pipe to be tested. Accordingly, means are desirably included to relieve any such excess pressure to assure more accurate readings.

Such means may, in connection with the FIGURES 7-9 embodiment, take the form illustrated in FIGURES 7C and 13. Here is seen in the lower body portion 296 of to tool, the port 271, which communicates fluid from the channel 292 into the annulus between the packers 297 and 299. It will be understood that the port 271 is located just above the lower packer 299, and the packers 297 and 299 are located a significant distance apart, for example 100 feet.

Located just below the upper packer 297, is a crossbore and check valve arrangement which permits fluid communication at times between the channel 292 and the annulus between the packers. This arrangement comprises a small lateral bore 281 drilled through the connector bar 277 perpendicular to the longitudinal axis of the tool. In this embodiment, the bore 281 is drilled through the wrench flats 253, 255, although it will be recognized that this exact positioning of the bore is not necessary. A counterbore 283 is drilled into the bar 277 a distance just slightly less than the total distance across the bar. At least the end portion of the counterbore is threaded. A ball check valve 285 is positioned inside the counterbore, and a threaded plug 287 having a projecting pin 289 is inserted, the plug being securely held in the counterbore by means of the mating threads. The total length of the plug and pin is sufficiently great to keep the ball check 285 from moving into the channel 292 and thus obstructing the flow of fluid in that channel. The pin is sufficiently short, however, to give the ball check 285 ample room for movement to seat and to move off the seat to allow fluid passage through the bore 281 into counterbore 283 and thence into the longitudinal channel 292.

By means of this cross-bore and check valve arrangement, excess air pressure in the annulus can be relieved after the testing fluid is introduced. For example, after the packers have been set, and testing fluid has been introduced into the annulus through the port 271 to fill the annulus from the lower packer to a point just below the wrench flats 253 and 255, the air in the annulus will be compressed and will occupy the relatively small area in the annulus between the top of the water level and the upper packer 297. The check valve 285 will remain on seat during the introduction of testing fluid, since the pressure on introduction will be greater than the air pressure just outside the bore 281. However, after termination of the introduction of testing fluid, the pressure in the channel 292 will be released and the pressure in that channel will be less than the air pressure outside the bore 281. Consequently, the check valve will move off seat, and the excess air pressure will be bled off through the longitudinal fluid channel 292.

*Operation of the FIGS. 7-9 embodiment*

In operation, the tool 201 is positioned in the pipe to be tested so that the packers 297 and 299 are located just below and above the area of pipe to be tested, and the opening 204 is free for attachment of a hose or the like to bring fluid into the tool.

Fluid under pressure, for example water, is then brought into the opening 204, from whence it flows down the central longitudinal channel 226 of the tool. With the tool in the initial position illustrated in FIGS. 7A, 7B fluid communication is established through radial channel 228 into channel 258 of ring 254, and thence into longitudinal channel 278 of the valve body 206 and longitudinal channel 284 in the lower portion of the tool. As fluid under pressure flows into the longitudinal channel 284, the packers simultaneously are set in the manner as described in connection with FIGURES 2D, 2F, for example. As one example, the pressure needed to set the packers might be 1200 p.s.i. During this time, the spool 216 is prevented from moving downwardly by the spring 222 urging upwardly against the valve neck 212.

The pressure buildup through the channel 226 continues until the spring tension is overcome. At this point, the spool will begin to move downwardly toward the lowermost position illustrated in FIGURES 8A, 8B. But after the radial channel 228 and its associated slots have completely passed the O-ring 266, there will be no further fluid communication between the central channel 226 and the channels 258, 278, 284. Instead, there will be fluid isolation between the channel 226 and these latter channels. But since there is no fluid outlet from these latter channels, the fluid remaining therein is effective to keep them under the same pressure as present when the valve spool moved downwardly. And since the cavity 234, and longitudinal channels 248 and 250 are in fluid communication with the channels 258, 278, 284, the pressure remains in those areas also. The check valve 240 thus remains in its uppermost position as seen in FIG. 7B.

In its intermediate position thus described, the radial channel 228 from channel 226 is adjacent the groove 263, and there is fluid communicaton with neither the packer setting longitudinal channel nor the annulus pressurizing longitudinal channel.

As the pressure buildup in the central channel 226 continues, the pressure in the channels 258, 278, 284, and cavity 234, etc., remains the same. Finally the pressure in the central channel will be sufficiently greater than the pressure in the channels 258, 278, 284, 234, to move the ball check valve 240 downwardly against the pressure of spring 236. When the check 240 moves to its lowermost position adjacent the piston 232, fluid communication between central channel 226 and the various channels 258, 278, 284, 248, 250 and cavity 234 will be thus reestablished. The pressure in this system then continues to build up (for one example, to about 2000 p.s.i.) until the spool moves downwardly to its lower position as seen in FIGURES 8A, 8B.

When the valve spool 216 reaches the FIGS. 8A, 8B position, the pressure in the central channel 226 (which is now communicating with the nonpressurized longitudinal channel 286, channel 292, and the annulus area) will be less than the existing pressure in the channels 258, 278, 284, etc. Hence, the ball 240 will return to its closed position illustrated in the drawings.

In this FIG. 8A, 8B position, the fluid in central channel 226 communicates through radial channel 228 with the longitudinal channel 286 and thence to the annulus pressurizing central longitudinal channel 292 in the lower portion of the tool. As pressurized fluid flows through this system, the pressure in the annulus between the packers 297 and 299 is built up to the desired amount. For one example, the annulus may be pressurized to about 5000 p.s.i. But when the pressure in the annulus first exceeds the pressure in the cavity 234 and channels 258, 278, 284, etc. (which in the example above was 2000 p.s.i.), the ball check valve 240 will again open, and in effect there will be a single fluid system in the tool.

When static conditions are finally reached, at say 5000 p.s.i., the ball check valve will again close because of the urging of the spring 236.

The excess air pressure in the annulus may be bled off in the manner described above in connection with FIGURE 7C. The pressure in the annulus is then measured in any suitable manner to determine whether or not a leak is present.

When the test has been completed, the pressure in the annulus is bled off through the channels 292, 286, 260, and thence through channel 226 since the tool is still in the FIGS. 8A, 8B position. This bleeding off of pressure may be continued until the pressure in the channels 292, 286, 260 etc. is substantially atmospheric. However, it is recognized that the pressure in the channels 258, 278, 284, cavity 234, etc., remains at full annulus test pressure, viz. 5000 p.s.i. in the example given above. The check valve, of course, remains closed. And the packers 297 and 299, of course, remain set.

If it is then desired to add a new joint of pipe and test the new joint, the valve spool 216 is pulled up (by pulling up on upper body portion 202, as for example by means for a removable overshot or a permanently attached wire line) until it is returned to its uppermost position illustrated in FIGS. 7A, 7B. The fluid in the channels 258, 278, 284, cavity 234, etc. is then bled off through the channels 228, 226—as can be readily seen by reference again to FIGS. 7A, 7B.

When this pressure is released in this manner, the packers 297, 299 will be relaxed and the tool can be lifted up until the area between packers 297 and 299 is adjacent the next area of the pipe to be tested.

The process as described above may then be repeated for as many joints of pipe as may be desired.

*The embodiment of FIGURES 10–12*

The embodiment of FIGURES 10–12 is quite similar to the embodiments of FIGURES 7–9.

The tool 301 of the FIGS. 10–12 embodiment comprises generally an upper body portion 302, a valve body portion 306 and valve body extensions 308 and 310, and a lower body portion [not shown], all of which are concentrically positioned along the longitudinal axis of the tool and have an outside diameter substantially equal to the overall outside diameter of the tool. The lower body portion includes a couple of resilient packers such as described in connection with the foregoing embodiments.

The valve body 306 and valve body extensions 308 and 310 are each formed with a central bore 307 extending along the longitudinal axis therof. In this bore is slidingly mounted a valve spool 316 which is operatively connected through valve neck 312 to the upper body portion 302, in the same manner as described above in connection with the FIGS. 7–9 embodiment.

Valve spool 316 includes a central longitudinal channel 326.

At its lower end, the valve spool 316 is provided with a piston 332, and the piston 332 may be formed integral with the spool 316 if desired. The piston 332 is adapted to sealingly move longitudinally within the elongate cylinder 344 in the same manner described above in connection with the embodiment of FIGS. 7–9.

An area 333 [not shown; see area 233 of FIGURES 7–9] in the FIGURES 10–12 embodiment corresponds to the area 233 in the FIGURES 7–9 embodiment. This area is the cross-sectional area formed between the outer surface of the valve spool 316 and the inner surface of the cylinder 344. In the embodiment of FIGURES 10–12, it will be noted that the outer surface of valve spool 316 is irregular in shape between O-rings 376 and 352. This is immaterial insofar as operation of the apparatus is concerned, since it is the difference in the cross-sectional area of the valve spool at the upper O-ring 376 and the cross-sectional area of the cylinder at the lower O-ring 352, which is important. This is true of the FIGURES 7–9 embodiment as well; in that embodiment the spool 216 was shown to be of constant diameter.

A relatively short longitudinally extending cavity 334 is provided along the central axis of the valve spool, the lower edge of the cavity presenting a flat face 331 within the lower portion of the spool. A coil spring 336 is positioned in cavity 334, and above the spring is placed a ball check valve 340. The check valve 340 is urged by the spring 336 to its uppermost position, to thereby keep the lower opening to channel 326 closed. But when the tension of spring 336 is overcome and the ball check 340 moves downwardly into the cavity 334, fluid communication is established between the channel 326 and the annular area 335 between the valve spool and the valve body 306, by means of fluid flow through a radially extending channel 338 which opens into cavity 334.

Like the valve spool 216 of the FIGS. 7–9 embodiment, the valve spool 316 has a radial channel 328 which is effective for the transfer of fluid from the central fluid channel 326 to the exterior of the valve spool. As will be readily understood, transfer of fluid to different areas is accomplished by longitudinal movement of the valve spool. A plurality of slots 330 are included adjacent the radial channel 328, to thereby transfer fluid a slight longitudinal distance from the channel 328. In addition, another group of slots 375 are longitudinally spaced on the spool 316 below the channel 328. Each of these slots is adapted, upon proper positioning, to by-pass certain of the O-rings.

Also as in the FIGS. 7–9 embodiment, the valve body 306 contains a couple of longitudinal channels 378 and 386. The lower portion of the tool contains a longitudinal central channel 392 which is effective when pressurized to transmit fluid into the annulus between the packers, and to pressurize the fluid in that annular area. The lower portion of the tool also contain a concentric annular channel 384, through which fluid may be introduced to set the packers. The longitudinal channels 378 and 386 in the valve body 306 are in fluid communication with the channels 384 and 392, in the same manner as previously discussed with reference to the FIGS. 7–9 embodiment.

A portion of the valve body 306 is formed with a central bore 305, 305a, of diameter larger than the bore 307. Into this larger bore are placed the annular longitudinally extending rings 354 and 356, and the valve cylinder 344. The bottom of piston 332 moves in sealing engagement in the cylinder 344, downward movement of the piston being limited by contact of the shoulder 314 with the shoulder 321.

Rings 354 and 356 contain radial channels which are effective in selectively transferring fluid from the central channel 326 into the various channels in the lower portion of the tool, namely the packer setting channel 384 and the annulus pressurizing channel 392. Thus, ring 354 contains the radial channel 358, and ring 356 contains the radial channel 360.

Suitable sealing means are included on both sides of each such radial channel 358 and 360, on both the inner circumferential face of the rings 354 and 356, and the outer circumferential face thereof. Such sealing means desirably comprise the O-rings 362, 366, 364, 368, 372, 376, 370 and 374, which are positioned and function just as described above in connection with the FIGS. 7–9 embodiment.

Sealing means are also desirably included in the outer circumferential face of the valve cylinder 344. Such means desirably comprise the O-ring 346.

Urging means are also included to generally urge the valve spool 316 upwardly, and urging means are further included in this embodiment to urge the spool 316 generally downwardly. In this manner, a balance of forces is created at static conditions.

The valve body extension 308 is formed with a counterbore 325 somewhat larger than the diameter of the bore 307 into which the spool is slidingly mounted. An annular ledge 337 projects inwardly to separate the counterbore into portions 325a and 325b. The inner diameter of the ledge 337 is approximately the same as the diameter of the central bore 307. Ledge 337 presents an annular upwardly facing shoulder 318 on one side thereof, and an annular downwardly facing shoulder 347 on the opposite side thereof.

Shoulder 318 defines the lower face of an opening 320 into which is placed a coil spring 322. The upper end of opening 320 is defined by the lower face 314 of the valve neck 312. The coil spring 322 thus exerts an upward force against the valve neck (and its operatively associated valve spool), by bearing against the surface 314.

Shoulder 347, on the other hand, defines the upper end of an opening 343 having the same diameter as opening 320, but being considerably shorter in length than the opening 320. The lower end of the opening 343 is defined by an outwardly extending annular flange 345 on valve spool 316, which is seen in FIGURE 10. Into the opening 343 is placed a coil spring 341 which is seen to urge the valve spool 316 downwardly by bearing against the flange 345. The spring 341 is thus seen to work directly against the spring 322.

Any suitable spring tension may be placed on the springs 322 and 341 so that the spring balance may be adjusted as desired. The spring balance will determine the "at rest" position of the valve spool. That position is illustrated in FIGURE 10, and will be more fully explained below in the description of the operation of this embodiment.

It is readily seen that the valve spool 316 is free for limited longitudinal movement within the central bore 307 relative to the valve body and associated members. Communication of fluid from the central channel 326 of the valve spool to various of the channels in the lower portion of the tool, to selectively set the packers, pressurize the annulus, etc., may be readily established by movement of the radial channel 328 into contact with various of the connecting channels 358, 360, etc.

The lower portion of the tool 301 may be constructed just like the lower portion 296 of the tool 201. Accordingly, it will be desirable in many contexts of use to include a cross-bore and check valve arrangement such as that illustrated at 283, 285 in FIGURES 7C and 13.

*Operation of the FIGS. 10–12 embodiment*

The spring tensions of the springs 322 and 341 are adjusted so that the "at rest" position of the valve spool 316 is as seen in FIGURE 10. In this initial position, fluid in the central channel 326 is in communication with the packer setting channel 384 through longitudinal channel 378 and radial channel 358, and the radial channel 328 off the central channel. Fluid in the central channel is also in communication with the annular area 335 around the piston, through the check valve opened by the fluid pressure in channel 326. Consequently, the fluid pressure in the channel 326 acts on the effective cross-sectional area 333 to urge the piston 332 downwardly.

Therefore, when the tool 301 is positioned in a pipe so that the area of the pipe between the packers is the area to be tested, and fluid is brought into the central channel 326 through the opening 304 by a hose or the like, the packers are set in the same manner as described above in connection with the FIGS. 7–9 embodiment.

After the packers have been set and pressure buildup in the central channel and all areas opening to it continues, the pressure acting on the area 333 will become sufficient to overcome the spring 322 to begin to move the spool 316 downwardly toward the position illustrated in FIGURE 11.

Once radial channel 328 and its associated slots 330 move past the O-ring 366, the fluid in channels 358, 378, 384 is sealed off and isolated from the other fluid channels in the tool.

Further increase in pressure will cause the valve spool to be moved downwardly into its lowermost position illustrated in FIGURE 11. In this position, the radial channel 328 is in fluid communication with 360 and longitudinal channels 386 and 392. Since these channels are not pressurized, the central channel 326 will be under less pressure than the area 335, and hence the spring 336 will be effective to cause the ball check valve 340 to seat. This position is seen in FIGURE 11.

Fluid pressure in the channel 326 is thus effective to pressurize the annulus between the tool and the pipe to be tested, and between the upper and lower packers. The annulus may be pressurized to any desired pressure, for example 5000 p.s.i. But when the pressure in the channels 326, 386, 392 exceeds the pressure in the area 335, the ball check valve will be opened. And when static conditions are finally reached, the check valve will close once again.

After the test has been completed, it will be desired to bleed off the pressure in the annulus. This is done by detaching the hose or the like from the opening 304 while the tool is in the FIGURE 11 position, to thereby bleed off the excess annulus pressure through central channel 326 until the annulus pressure is for example, atmospheric. The pressure on the packers is then released so that the tool may be moved to the next test. This is done by pulling the valve spool to its uppermost position which is illustrated in FIGURE 12. In this position, it will be readily seen that the central channel is in fluid communication with the packers through the channels 384, 378, 358, and 328. Thereby packer pressure is released.

The slots 375 allow fluid by-pass around the O-ring 376, so that fluid may flow between the area 335 and the channels 360, 386, and 392. Consequently, actuating pressure in the area 335 is released to the annulus. The area behind the ball check valve (cavity 334, annular area 335, and channels 360, 386, 392) is then reduced to approximately atmospheric pressure. Fluid communication is established between the annular area 335 (around the O-ring 376) and the annulus between the packers through the channels 360, 386, 392. In this manner, it is seen that the pressure in the area 335 is released because the fluid in this area is bled off into the annulus between the packers.

When force is no longer exerted to pull the spool 316 up, the spool will return to the "at rest" position of FIG. 10, earlier described.

With the tool illustrated in this embodiment, it is thus seen that a method is provided for bleeding off actuating pressure in area 335 into the annulus between the packers. In many contexts of use, this feature is found to have significant advantages over those procedures available in the prior art.

Although the various fluid channels through the tools are of considerable length, it is recognized that these channels are quite small in cross-sectional area. Hence, the total volume necessary to fill these channels is not large, and the time required to set the packers is extremely small. Thus, it is seen that the tool in all the foregoing embodiments is responsive to almost instantaneous action in setting the packers, and the complete operation of testing a section of pipe takes only a matter of seconds.

It is also seen that a tool is provided in which the upper packers may be set independently from the lower packers, and further the upper packers may be sealed in place after they are set.

Further, it is seen that a tool is provided wherein the upper and lower packers may be set independently, but at the same time the tool may be only slightly modified so that the packers may be set simultaneously.

It is also recognized that the fluid used to test the pipe may be different from the fluid used to set the packers. However, the testing fluid may desirably have another function in sealing the first set of packers.

It is further seen that a tool is provided which may be left in place in the pipe to be tested until it is desired to remove or reposition the tool, without injury to the inner surface of the pipe and without the use of secondary equipment such as slips.

Also, it is seen that in some embodiments a tool is provided wherein the packers may be set and the annulus pressurized by fluid from the same fluid channel, but wherein the annulus is completely independent of the packers.

Further, a tool is provided in one embodiment wherein the packers are pressurized in a closed system by small amounts of fluid from an exterior source of fluid under pressure.

It is further seen that in accordance with one embodiment of this invention, a tool is provided which allows the actuating fluid under pressure to be readily transferred to the annulus between the packers, after completion of the test.

Further, in accordance with one embodiment of the invention, a tool is provided wherein the annulus may be pressurized to any desired amount, including a pressure less than that at which the packers are set.

It is also seen that a testing tool and method of operation are provided wherein the release of the packers is completely independent of the pressure in the annulus between the packers.

Further, it is seen that various methods of operation are provided in the different embodiments which are distinctly superior to methods available in the prior art.

While the invention has been described in terms of particularly useful embodiments, it will be understood by those skilled in the art that various changes and modications may be made in the embodiments disclosed without departing from the scope of the invention. For example, different fluids may be employed in a single test, for instance a liquid such as water and a gas such as nitrogen.

What is claimed is:

1. An elongate tool suitable for testing a section of pipe comprising a generally cylindrical body of a length greater than the section of pipe to be tested, and a diameter slightly less than the inside diameter of the pipe to be tested, having:

a first and a second fluid opening in the top portion thereof, each said opening adapted to receive a fluid under pressure;
   said first opening communicating with a first longitudinally extending fluid channel,
   said second opening communicating with a second longitudinally extending fluid channel,
a valve body concentric with the longitudinal axis of the tool and having therein a plurality of fluid channels;
a series of ported rings sealingly separated from one another, said rings being aligned with their center on the axis of the tool;
a valve spool slidingly mounted through the center of each of said rings, said valve spool having therein
   each said first and second longitudinally extending fluid channels,
   means for transferring the fluid from said fluid channels to one of said rings, and
   spaced recesses in the outer surface thereof for transmitting fluid around the seal separating one said ring from the adjacent ring,
   said rings and spool providing means for maintaining at times fluid communication and at times fluid isolation between channels in said valve body and each said first and second longitudinally extending channels;
an upper packer body comprising at least one resilient packer element adapted to expand radially into sealing engagement with the inner surface of the pipe to be tested upon compression, and a longitudinally movable piston adapted to compress said packer element upon actuation by a fluid under pressure;
a lower packer body comprising at least one resilient packer element adapted to expand radially into sealing engagement with the inner surface of the pipe to be tested upon compression, and a longitudinally movable piston adapted to compress said packer element upon actuation by a fluid under pressure; and,
a port located intermediate said upper and lower packers for introduction of testing fluid from the interior of the tool into the annulus between the tool and the inner surface of the pipe to be tested, whereby fluid flows from one of the channels in said valve body to said upper packer, said lower packer, or said port.

2. The invention according to claim 1, wherein said recesses are spaced in such a manner that said upper packer is actuated independently from said lower packer.

3. The invention according to claim 1, wherein said recesses are spaced in such a manner that said upper packer is actuated simultaneously with said lower packer.

4. An elongate tool suitable for testing a section of pipe, said tool having a generally cylindrical body longer than the section of pipe to be tested, and slightly smaller in diameter than the inside diameter of the pipe to be tested, and comprising:
   a first set of longitudinally extending fluid channels in the upper part of the tool;
   an opening in communication with each of said channels for introducing fluid under pressure into said channels;
   a second set of longitudinally extending fluid channels in the lower part of the tool;
   a resilient packer adapted for radial movement into sealing engagement with the inner surface of pipe to be tested upon compression, and a longitudinally movable piston member adapted to compress said packer upon longitudinal movement in a direction toward said packer, said piston member being moved longitudinally in such direction upon the introduction of fluid under pressure into a first fluid channel of said second set;
   another resilient packer near the bottom of the tool adapted for radial movement into sealing engagement with the inner surface of the pipe to be tested upon compression, and a longitudinally movable piston member adapted to compress said packer upon longitudinal movement in a direction toward said packer, said piston member being moved longitudinally in such direction upon the introduction of fluid under pressure into a second fluid channel of said second set;
   a port between said two resilient packers for communication of testing fluid from a third fluid channel in said second set; and,
   means for transferring fluid from a selected one of the fluid channels of said first set into a selected one of the fluid channels of said second set, whereby said packers may be actuated, or said test fluid emitted, at preselected times.

5. The invention according to claim 4, wherein said means for transferring fluid comprises:
   a generally cylindrical valve spool having the channels of said first set extending longitudinally therethrough, and terminating therein; and,
   a series of rings slidingly mounted around the outer surface of said spool, each of said rings having a port therein and each of said rings being separated from adjacent rings by sealing means, whereby communication is established from the terminating channels of said first set to certain of the ported rings according to the position of the spool in said rings.

6. The invention according to claim 5, wherein said valve spool has in the outer surface thereof spaced recesses for providing communication around a seal separating two of said rings.

7. The invention according to claim 6, wherein said recesses are positioned so that said upper packer may be actuated independenly of said lower packer.

8. The invention according to claim 6, wherein said recesses are positioned so that said upper packer may be actuated independently of said lower packer.

9. The invention according to claim 4, wherein the distance between said upper and lower packers may be readily altered by the insertion or removal of connector bars.

10. A method of testing a section of pipe for leaks which comprises:
   providing an elongate testing tool having upper and lower resilient packer elements, and openings for the entry of fluid under pressure;
   positioning said tool inside the section of pipe to be tested so that the openings are located at the top of the pipe, and the section of pipe to be tested is located intermediate the upper and lower packers;
   introducing a fluid under pressure into the first of said openings to move the lower packers into sealing engagement with the inner surface of the pipe to be tested;
   then introducing a fluid under pressure into the second of said openings to close the path of fluid flow to said lower packer and thereby seal the lower packer in its actuated position;
   then introducing a fluid under pressure into the first of said openings to move the upper packers into sealing engagement with the inner surface of the pipe to be tested, thus forming a fluid tight annulus between the tool and the inner surface of the pipe to be tested between said upper and said lower packers;
   then introducing a fluid under pressure into the second of said openings to pressurize said fluid tight annulus; and,
   measuring pressure drop in this annulus to detect leaks in the pipe.

11. A method of testing a section of pipe for leaks which comprises:
   providing an elongate testing tool having upper and lower resilient packers, and openings for the entry of fluid under pressure,
   positioning said tool inside the section of pipe to be tested so that the openings are located at the top of the pipe, and the section of pipe to be tested is located intermediate the upper and lower packers;
   introducing a fluid under pressure into the first of said opening to move both the upper and lower packers into sealing engagement with the inner surface of the pipe to be tested, and thereby forming a fluid tight annulus between the tool and the inner surface of the pipe to be tested between said upper and lower packers;
   introducing a fluid under pressure into the second of said openings first to close the path of fluid flow to each of said packers and thereby seal said packers in their actuated position, whereby said packers remain set firmly in the pipe to be tested until disengaged, and then to pressurize said annulus with fluid; and,
   measuring the pressure drop in this annulus to detect leaks in the pipe.

12. A method of testing a section of pipe for leaks which comprises:
   providing an elongate testing tool having upper and lower resilient packers, and openings for the entry of fluid under pressure,
   positioning said tool inside the section of pipe to be tested so that the openings are located at the top of the pipe, and the length of pipe to be tested is located intermediate the upper and lower packers;
   introducing a fluid under pressure into the first of said openings to move the lower packers into sealing engagement with the inner surface of the pipe to be tested;
   then introducing a fluid under pressure into the second of said openings to close the path of fluid flow to said lower packer and thereby seal the lower packer in its actuated position;
   then introducing a fluid under pressure to displace matter in the annulus between the tool and the inner surface of the pipe to be tested above the lower packer;
   then introducing a fluid under pressure into the first of said openings to move the upper packers into sealing engagement with the inner surface of the pipe to be tested, forming a fluid tight annulus whereby said packers remain set firmly in the pipe to be tested until disengaged;

introducing a fluid under pressure into the second of said openings to pressurize said fluid tight annulus;

measuring pressure drop in this annulus to detect leaks in the pipe.

13. An elongate tool suitable for testing a section of pipe, said tool being at least slightly longer than the section of pipe to be tested, and being at least slightly smaller in diameter than the diameter of the inner wall of the pipe to be tested, and comprising:

a generally cylindrical elongate body portion;

an opening in said body portion, for communication of fluid into said tool from a source of fluid exterior to said tool;

a first resilient packer element on said body portion longitudinally spaced from said opening, said packer element adapted upon compression thereof for radial movement into sealing engagement with the inner wall of said pipe;

a second resilient packer element on said body portion longitudinally spaced from said first packer element in a direction opposite said opening, said second packer element also adapted upon compression thereof for radial movement into sealing engagement with the inner wall of said pipe;

an annular fluid-receiving space being defined between said first packer element and said second packer element, and between said tool and the inner wall of said pipe;

packer setting means adapted upon actuation by entry of fluid under pressure into a first longitudinal fluid channel, to compress each said first and said second packer elements;

a first longitudinal fluid channel in said body portion, said channel being in fluid communication with said packer setting means;

a second longitudinal fluid channel in said body portion, said second channel being in fluid communication with said annular space;

a third longitudinal fluid channel, said third longitudinal fluid channel being in fluid communication with said opening in said body portion;

means for establishing fluid communication at times between said third and first fluid channels to actuate said packer setting means to thereby simultaneously set said packers, and at times between said third and second fluid channels, while maintaining fluid isolation between said third and first fluid channels, to thereby pressurize said annular space so that said section of pipe may be tested at any desired pressure; and, means for establishing fluid communication at times between said first, second, and third fluid channels, so that an increase in pressure in said third fluid channel simultaneously increases to approximately the same extent the pressure in said annular area and on said packers.

14. Apparatus in accordance with claim 13, wherein said means for establishing fluid communication between said third fluid channel and one of said first or second fluid channels comprises a radial channel communicating at all times with said third fluid channel and adapted for longitudinal movement with respect to each said first and second fluid channels.

15. Apparatus in accordance with claim 13, wherein said means for establishing fluid communication between said first, second and third fluid channels comprises a check valve in said third fluid channel.

16. An elongate tool suitable for testing a section of pipe, said tool being at least slightly longer than the section of pipe to be tested, and being at least slightly smaller in diameter than the inner wall of the pipe to be tested, and comprising:

a generally cylindrical elongate body portion;

an opening in said body portion, for communication of fluid into said tool from a source of fluid exterior to said tool;

a first resilient packer element on said body portion longitudinally spaced from said opening, said packer element adapted upon compression thereof for radial movement into sealing engagement with the inner wall of said pipe;

a second resilient packer element on said body portion longitudinally spaced from said first packer element in a direction opposite said opening, said second packer element also adapted upon compression thereof for radial movement into sealing engagement with the inner wall of said pipe;

an annular fluid-receiving space being defined between said first packer element and said second packer element, and between said tool and the inner wall of said pipe;

packer setting means adapted upon actuation by entry of fluid under pressure into a first longitudinal fluid channel, to compress each said first and said second packer elements;

a first longitudinal fluid channel in said body portion, said channel being in fluid communication with said packer setting means;

a second longitudinal fluid channel in said body portion, said second channel being in fluid communication with said annular space;

a spool member having therein a third longitudinal fluid channel, said third longitudinal fluid channel being in fluid communication with said opening in said body portion, and with a lateral fluid channel; and, means for urging said spool member toward a first position, in which position fluid communication is established between said third fluid channel and said first fluid channel through said lateral fluid channel, to actuate said packer setting means to thereby simultaneously set said packers;

an increase in fluid pressure in said third channel acting to overcome said urging means to move said spool longitudinally whereby fluid communication is established between said third channel and said second channel, while maintaining fluid isolation between said third and first fluid channels, to thereby pressurize said annular space so that said section of pipe may be tested at any desired pressure.

17. An elongate tool suitable for testing a section of pipe, said tool being at least slightly longer than the section of pipe to be tested, and being at least slightly smaller in diameter than the diameter of the inner wall of the pipe to be tested, and comprising:

a generally cylindrical elongate body portion;

an opening in said body portion, for communication of fluid into said tool from a source of fluid exterior to said tool;

a first resilient packer element on said body portion longitudinally spaced from said opening, said packer element adapted upon compression thereof for radial movement into sealing engagement with the inner wall of said pipe;

a second resilient packer element on said body portion longitudinally spaced from said first packer element in a direction opposite said opening, said second packer element also adapted upon compression thereof for radial movement into sealing engagement with the inner wall of said pipe;

an annular fluid-receiving space being defined between said first packer element and said second packer element, and between said tool and the inner wall of said pipe;

a packer setting means adapted upon actuation by entry of fluid under pressure into a first longitudinal fluid channel, to compress each said first and said second packer elements;

a first longitudinal fluid channel in said body portion, said channel being in fluid communication with said packer setting means;

a second longitudinal fluid channel in said body portion, said second channel being in fluid communication with said annular space;

a spool member having therein a third longitudinal fluid channel, said third longitudinal fluid channel being in fluid communication with said opening in said body portion, and with a lateral fluid channel;

means for urging said spool member toward a first position, in which position fluid communication is established between said third fluid channel and said first fluid channel through said lateral fluid channel, to actuate said packer setting means to thereby simultaneously set said packers;

an increase in fluid pressure in said third channel acting to overcome said urging means to move said spool longitudinally whereby fluid communication is established between said third channel and said second channel, while maintaining fluid isolation between said third and first fluid channels, to thereby pressurize said annular space so that said section of pipe may be tested at any desired pressure; and, means for establishing fluid communication at times between said first, second, and third fluid channels, so that an increase in pressure in said third fluid channel simultaneously increases to approximately the same extent the pressure in said annular space and on said packers.

18. Apparatus in accordance with claim 17, wherein said means for establishing fluid communication between said first, second and third fluid channels comprises a check valve in said third fluid channel, opening of said check valve resulting in fluid communication between each said first, second, and third fluid channels, thereby allowing said annular area and said packers to be pressurized simultaneously and to the same extent by entry of fluid under pressure through said opening into said third fluid channel.

19. Apparatus in accordance with claim 17, wherein said urging means comprises a resilient spring.

20. Apparatus in accordance with claim 17, which additionally includes a bore between said annulus and said second fluid channel, and a check valve in said bore so that when the pressure in said fluid channel is greater than the pressure in said annulus the check valve will be closed and there will be fluid isolation between said channel and said annulus, but when the pressure in said annulus exceeds the pressure in said channel, the check valve will open and there will be fluid communication between said annulus and said channel.

21. An elongate tool suitable for testing a section of pipe, said tool being at least slightly longer than the section of pipe to be tested, and being at least slightly smaller in diameter than the diameter of the inner wall of the pipe to be tested, and comprising:

a generally cylindrical elongate body portion;

an opening in said body portion, for communication of fluid into said tool from a source of fluid exterior to said tool;

a first resilient packer element on said body portion longitudinally spaced from said opening, said packer element adapted upon compression thereof for radial movement into sealing engagement with the inner wall of said pipe;

a second resilient packer element on said body portion longitudinally spaced from said first packer element in a direction opposite said opening, said second packer element also adapted upon compression thereof for radial movement into sealing engagement with the inner wall of said pipe;

an annular fluid-receiving space being defined between said first packer element and said second packer element, and between said tool and the inner wall of said pipe;

packer setting means adapted upon actuation by entry of fluid under pressure into a first longitudinal fluid channel, to compress each said first and said second packer elements;

a first longitudinal fluid channel in said body portion, said channel being in fluid communication with said packer setting means;

a second longitudinal fluid channel in said body portion, said second channel being in fluid communication with said annular space;

a spool member having therein a third longitdinal fluid channel, said third longitudinal fluid channel being in fluid communication with said opening in said body portion, and with a lateral fluid channel, and said spool member being operably connected to a piston member;

means for urging said spool member toward a first position, in which position fluid communication is established between said third fluid channel and said first fluid channel through said lateral fluid channel, to actuate said packer setting means to thereby simultaneously set said packers;

an increase in fluid pressure in said third channel acting to transfer fluid into an area adjacent said piston to actuate said piston to thereby overcome said urging means and to move said spool longitudinally whereby fluid communication is established between said third channel and said second channel, while maintaining fluid isolation between said third and first fluid channels, to thereby pressurize said annular space so that said section of pipe may be tested at any desired pressure; and, means for establishing fluid communication between said area adjacent said piston and said second fluid channel, so that the actuating pressure may be bled off into said annulus.

22. Apparatus in accordance with claim 21, wherein said urging means comprises two independent and oppositely acting springs.

23. Apparatus in accordance with claim 21, wherein said means for establishing fluid communication between said area adjacent said piston and second fluid channel includes a groove in the outer surface of said spool member.

24. A method for testing a section of pipe for leaks which comprises:

providing an elongate testing tool having first and second resilient packer elements, and an opening for the entry of fluid under pressure;

positioning said tool inside the section of pipe to be tested so that said opening is located at one end of the pipe, and the section of pipe to be tested is located intermediate the first and second packers;

introducing fluid under pressure into said opening, to move said first and second packers simultaneously into sealing engagement with the inner wall of said pipe, thus forming a fluid-tight annular space between the tool and the inner wall of the pipe between said first and second packers;

after setting of said packers, continuing the introduction of fluid into said opening, whereupon said path of fluid flow to said packers is closed to seal said packers in their actuated position, and fluid is transmitted into said annular space to pressurize said annulus to any desired level; and measuring pressure drop in said annular space to detect leaks in the pipe.

25. A method for testing a section of pipe for leaks which comprises:

providing an elongate testing tool having first and second longitudinally spaced apart resilient packer elements, an opening for the entry of fluid under pressure into a fluid channel in said tool, and means urging said fluid channel to a first position;

positioning said tool inside the section of pipe to be tested so that said opening is located at one end of the pipe, and the section of pipe to be tested is located intermediate the first and second packers;

introducing fluid under pressure into said fluid channel through said opening while said tool is in said first position, to thereby simultaneously move said packers into sealing engagement with the inner wall of said pipe, thus forming a fluid-tight annular space between the tool and the inner wall of the pipe between said first and second packer elements;

after thus setting said packer elements, introducing further fluid under pressure into said fluid channel through said opening, to overcome said urging means and move said fluid channel to a second position, wherein the path of fluid flow to said packers is closed and fluid communication is established between said fluid channel and said annular space;

after moving said fluid channel to said second position, introducing further fluid under pressure to substantially fill said annular space with fluid and establish a desired fluid pressure therein;

bleeding excess air pressure from said annular space through said fluid channel;

introducing still further fluid under pressure into said fluid channel to reestablish a desired fluid pressure in said annular space; and, thence measuring pressure drop in said annular space to detect leaks in said section of pipe.

26. The method according to claim 25, wherein fluid communication is established between said packers and said annular space after the pressure in said annular space is at least as great as the pressure at which said packers are set, so that upon further pressurizing of said annular space said packers are further pressurized simultaneously and to substantially the same extent.

27. A method for testing a section of pipe for leaks which comprises:

providing an elongate testing tool having first and second longitudinally spaced apart resilient packer elements, an opening for the entry of fluid under pressure into a fluid channel in said tool, and means urging said fluid channel to a first position;

positioning said tool inside the section of pipe to be tested so that said opening is located at one end of the pipe, and the section of pipe to be tested is located intermediate the first and second packers;

introducing fluid under pressure into said fluid channel through said opening while said tool is in said first position, to thereby simultaneously move said packers into sealing engagement with the inner wall of said pipe, thus forming a fluid-tight annular space between the tool and the inner wall of the pipe between said first and second packer elements;

after thus setting said packer elements, introducing further fluid under pressure into said fluid channel through said opening, to actuate said fluid channel to overcome said urging means and thereby move said fluid channel to a second position, wherein the path of fluid flow to said packers is closed and fluid communication is established between said fluid channel and said annular space;

after moving said fluid channel to said second position, introducing further fluid under pressure to substantially fill said annular space with fluid and establish a desired fluid pressure therein;

measuring pressure drop in said annular space to detect leaks in said section of pipe;

releasing fluid pressure from said annular space through said fluid channel; and, moving said fluid channel to a third position, whereupon the actuating fluid is bled off into said annular space.

28. The method in accordance with claim 27, wherein said fluid pressure is released from said annular space until the pressure therein is substantially ambient.

References Cited

UNITED STATES PATENTS

| | | | |
|---|---|---|---|
| 2,841,007 | 7/1958 | Loomis | 73—40.5 |
| 2,953,919 | 9/1960 | Potts | 73—40.5 XR |
| 2,998,721 | 9/1961 | Gawlik | 73—40.5 XR |
| 3,165,918 | 1/1965 | Loomis | 73—40.5 |
| 3,165,919 | 1/1965 | Loomis | 73—40.5 |
| 3,333,459 | 8/1967 | Claycomb | 73—40.5 |
| 3,354,697 | 11/1967 | Wilkerson | 73—40.5 |

S. CLEMENT SWISHER, *Acting Primary Examiner.*

JEFFREY NOLTON, *Assistant Examiner.*